US009872337B2

(12) United States Patent
Ayach et al.

(10) Patent No.: US 9,872,337 B2
(45) Date of Patent: Jan. 16, 2018

(54) BACKHAUL-OPTIMIZED BEAMFORMING IN IEEE 802.11AD NETWORKS

(71) Applicant: Google Inc., Mountain View, CA (US)

(72) Inventors: Omar El Ayach, San Jose, CA (US); Michael J. Hart, San Jose, CA (US); Peter Gelbman, Mountain View, CA (US)

(73) Assignee: Google LLC, Mountain View, CA (US)

(*) Notice: Subject to any disclaimer, the term of this patent is extended or adjusted under 35 U.S.C. 154(b) by 112 days.

(21) Appl. No.: 14/963,936

(22) Filed: Dec. 9, 2015

(65) Prior Publication Data
US 2017/0171912 A1  Jun. 15, 2017

(51) Int. Cl.
*H04W 84/12* (2009.01)
*H04B 10/114* (2013.01)
*H04B 10/27* (2013.01)
*H04L 5/00* (2006.01)
*H04Q 11/00* (2006.01)

(52) U.S. Cl.
CPC .......... *H04W 84/12* (2013.01); *H04B 10/114* (2013.01); *H04B 10/27* (2013.01); *H04L 5/0023* (2013.01); *H04Q 11/0066* (2013.01); *H04Q 2011/0064* (2013.01)

(58) Field of Classification Search
CPC ..... H04W 84/12; H04B 10/114; H04B 10/27; H04L 5/0023; H04Q 11/0066; H04Q 2011/0064
USPC ............................................ 398/45, 118, 130
See application file for complete search history.

(56) References Cited

U.S. PATENT DOCUMENTS

2009/0238156 A1  9/2009  Yong et al.
2012/0134320 A1*  5/2012  Khawer ................. H04L 49/90
                                                      370/328
2013/0059619 A1  3/2013  Kim et al.
(Continued)

FOREIGN PATENT DOCUMENTS

WO  WO-2010044599 A2  4/2010
WO  WO-2015069015 A1  5/2015

OTHER PUBLICATIONS

International Search Report and Written Opinion for Application No. PCT/US2016/062021 dated Feb. 23, 2017.
(Continued)

*Primary Examiner* — M. R. Sedighian
(74) *Attorney, Agent, or Firm* — Honigman Miller Schwartz and Cohn LLP

(57) ABSTRACT

A method includes receiving at least a first node connection from a network external to the data processing hardware. The network includes a network of nodes each operative to transmit and/or receive directional beams containing packets of data. The method also includes identifying an open first communication link between a first node and a second node of the network and determining a first recommended set of beam vectors to constrain a first scanning range of the first node when initiating beam forming with the second node. The method also includes transmitting the first recommended set of beam vectors to the first node. The first recommended set of beam vectors cause the first node to execute beam forming training with the second node using the first recommended set of beam vectors to establish the first communication link with the second node.

28 Claims, 11 Drawing Sheets

(56) References Cited

U.S. PATENT DOCUMENTS

| | | | |
|---|---|---|---|
| 2013/0143583 A1* | 6/2013 | Son | H04W 72/0406 |
| | | | 455/452.2 |
| 2014/0073337 A1 | 3/2014 | Hong et al. | |
| 2014/0341048 A1* | 11/2014 | Sajadieh | H04L 5/0085 |
| | | | 370/252 |
| 2015/0230263 A1 | 8/2015 | Roy et al. | |
| 2015/0257073 A1 | 9/2015 | Park et al. | |

OTHER PUBLICATIONS

European Search Report for the related EP application No. 16201888.1 dated Apr. 24, 2017.

\* cited by examiner

BACKHAUL-OPTIMIZED BEAMFORMING IN IEEE 802.11AD NETWORKS

TECHNICAL FIELD

This disclosure relates to backhaul-optimized beamforming in IEEE 802.11ad networks.

BACKGROUND

The IEEE 802.11ad standard defines an interoperable physical (PHY) and Media Access Control (MAC) layer that may be used to enable point-to-multipoint communication between nodes within a network. Wireless chipset providers are developing complementary metal-oxide-semiconductor (CMOS) based baseband and Radio Frequency Integrated Circuit (RFIC) solutions as part of an overall Wi-Fi chipset product offering to enable low cost and low power solutions instead of implementing proprietary protocols and technologies in either field-programmable gate array (FPGA) or as custom application specific integrated circuits (ASICs).

These CMOS wireless chipsets implementing the 802.11ad standard, however, are engineered with a focus on short-range mobile communications which ultimately shaped the design of protocol, algorithms and beam forming codebooks employed by the chipsets when executing beam forming operations. However, for larger antenna arrays needed for long-range communication, the number of beams to be scanned for achieving proper coverage increases, resulting in increases in overhead for beam forming operations and beam forming training needed to establish a communication link between a pair of nodes. In some scenarios, the larger antenna arrays used for long-range communication simply do not support wireless chipsets implementing the 802.11ad standard. As a result, the CMOS wireless chipsets using 802.11ad are optimized for the short-range, indoor type of application and are therefore suboptimal for use in high-bandwidth backhaul applications that require long-range stationary communication.

SUMMARY

One aspect of the disclosure provides a method for operating backhaul-optimized beam forming in IEEE 802.11ad networks. The method includes receiving, at data processing hardware, at least a first node connection from a network external to the data processing hardware and identifying, using the data processing hardware, an open first communication link between a first node and a second node of the network. The network includes a network of nodes each operative to transmit and/or receive directional beams containing packets of data. The method further includes determining, using the data processing hardware, a first recommended set of beam vectors to constrain a first scanning range of the first node when initiating beam forming with the second node. The method also includes transmitting the first recommended set of beam vectors to the first node. The first recommended set of beam vectors cause the first node to execute beam forming training with the second node using the first recommended set of beam vectors to establish the first communication link with the second node.

Implementations of the disclosure may include one or more of the following optional features. In some implementations, the method includes obtaining, using the data processing hardware, locations of the first node and the second node from memory hardware in communication with the data processing hardware and determining the recommended first set of beam vectors based on the second node location relative to the first node location. The recommended first set of beam vectors may constrain the first scanning range of the first node to expedite beam forming alignment with the second node. The method may also include obtaining, using the data processing hardware, a location of the first node and locations of a third node and a fourth node associated with a second communication link from memory hardware in communication with the data processing hardware and determining the recommended first set of beam vectors based on the first node location relative to the third node location and/or the fourth node location. The recommended first set of beam vectors may constrain the first scanning range of the first node to mitigate interference with the second communication link between the third node and the fourth node. In some implementations, the method includes obtaining, using the data processing hardware, antenna information associated with an antenna array of the first node from memory hardware in communication with the data processing hardware and determining the recommended first set of beam vectors based on the antenna information. The antenna information may include at least one of a position of the antenna array, a geometry of the antenna array, an orientation of the antenna array, or an environment of the antenna array.

The first node may execute beam form training with the second node by: executing an initiator transmitter sector level sweep constrained by the first recommended set of beam vectors while the second node receives on one or mode receiver directional beams; receiving one or more responder directional beams while the second node executes a responder transmitter sector level sweep, the received responder directional beams indicating an optimal initiator beam vector received by the second node during the initiator transmitter sector level sweep; transmitting sector sweep feedback to the second node, the sector sweep feedback indicating an optimal responder beam vector received by the first node during the responder transmitter sector level sweep; and when a sector sweep acknowledgement is received from the second node, establishing the first communication link using the optimal initiator beam vector at the first node and the optimal responder beam vector at the second node. In some examples, at least one of the first node or the second node execute a receiver sector level sweep to determine an optimal receiving beam vector while the other one of the first node or the second node executes the corresponding one of the initiator transmitter sector level sweep or the responder transmitter sector level sweep, the established first communication link based on the optimal receiving beam vector associated with at least one of the first node or the second node.

When the second node is connected to the network and the data processing hardware, the method may include: obtaining, using the data processing hardware, a location of the first node from memory hardware in communication with the data processing hardware; determining, using the data processing hardware, a second recommended set of beam vectors based on the first node location to constrain a second scanning range of the second node when the first node initiates the beam forming training with the second node; and transmitting the second recommended set of beam vectors to the second node, the second recommended set of beam vectors causing the second node to execute at least one of: the responder transmitter sector level sweep constrained by the second recommended set of beam vectors; or a receiver sector level sweep constrained by the second set of beam vectors while the first node executes the initiator transmitter sector level sweep. When the first communication link is established between the first node and the second node, the method may include receiving, at the data processing hardware, the optimal initiator beam vector and the optimal responder beam vector from at least one of the first node or the second node; and providing beam refinement protocol instructions to the first node and/or the second node based on the optimal initiator beam vectors and the optimal responder beam vectors. The beam refinement protocol instructions when received by the first node and/or the second node may cause a beam refinement protocol procedure to execute between the first node and the second node to optimize the first communication link.

In some examples, the first node executes beam forming training with the second node by, when the second node includes an undiscovered node: executing an initiator transmitter sector level sweep constrained by the first recommended set of beam vectors while the second node executes a receiver sector level sweep, the second node determining an optimal receiving beam vector associated with the receiver sector level sweep while the first node executes the initiator transmitter sector level sweep; receiving one or more responder directional beams from the second node while the second node executes a responder transmitter sector level sweep, the received responder directional beams constrained by a set of beam vectors using the optimal receiving beam vector and indicating an optimal initiator beam vector received by the second node during the initiator transmitter sector level sweep and the receiver sector level sweep; establishing the first communication link with the second node when the first node captures one or more of the responder directional beams from the second node during the responder transmitter sector level sweep; and informing the data processing hardware that the first communication link is established between the first node and the second node. When the first node is rediscovered after an intermittent disconnection from the network, the method may include receiving, at the data processing hardware, a connection request from the first node requesting connection to the previously established first communication link with the second node; obtaining, at the data processing hardware, locations and beam histories of the first node and the second node from memory hardware in communication with the data processing hardware. The method may also include determining, using the data processing hardware, bootstrap beam forming instructions based on the locations and beam forming histories of the first and the second node and transmitting the bootstrap beam forming instructions to the first node and the second node. The bootstrap beam forming instructions when received by the first node and the second node causing the first node and the second node to: re-establish the first communication link using the optimal initiator transmit and receive beam vectors and the optimal transmit and receive responder beam vectors specified by the beam forming histories without executing a sector level sweep procedure between the first node and the second node; and execute a beam refinement protocol procedure to optimize the re-established first communication link.

When the first communication link is associated with a secondary route not scheduled for data transfer, the method may include instructing, using the data processing hardware, the first node and the second node to periodically execute a beam tracking procedure to maintain the first communication link while not in use. In some examples, the method includes identifying, using the data processing hardware, a second communication link between a third node and a second node of the network. When the first communication link and the second communication link are outside an interference threshold, the method may include: determining, using the data processing hardware, the first communication link and the second communication link will not interfere with each other; and scheduling, using the data processing hardware, overlapping service periods using the same frequency over the first communication link and the second communication link without instructing any of the nodes associated with the first and second communication links to perform an interference assessment.

In some implementations, when the first communication link and the second communication link are within the interference threshold, the method includes determining, using the data processing hardware, a propensity for interference between the first communication link and the second communication link. The method may further include one of: determining, using the data processing hardware, beam tuning instructions for at least one of the nodes of the first communication link or the second communication link that causes the at least one node to adjust side lobe levels, or otherwise modify its beams, to mitigate the interference; instructing, using the data processing hardware, at least one of the nodes to perform an interference assessment; restricting, using the data processing hardware, the scheduling of overlapping service periods over the first communication link and the second communication link; or changing, using the data processing hardware, the frequency channel over at least one of the first communication link or the second communication link. In some examples, the method includes identifying, using the data processing hardware, a third node relative to the first node causing interference over the first communication link and obtaining, at the data processing hardware, locations and beam histories of the first node and the third node from memory hardware in communication with the data processing hardware. The beam forming histories may indicate beam vectors used by the first node and the third node.

The method may further include determining, using the data processing hardware, beam tuning instructions for the first node based on the first and third node locations and beam forming histories and transmitting the beam tuning instructions to the first node. The beam tuning instructions when received by the first node may cause the first node to adjust side lobe levels, or otherwise modify its beam (by for example steering a null in the interference direction), to mitigate the interference over the first communication link or the second communication link (in the case where transmitter side lobes are adjusted). Each node of the network may include a media access control layer configured to facilitate communication with one or more other nodes of the network and an application software layer in communication with the associated media access control layer and configured to facilitate communication with the data processing hardware.

Another aspect of the disclosure provides a network system for operating backhaul optimized beam forming in IEEE 802.11ad networks. The system includes data processing hardware external to a mesh network and memory hardware in communication with the data processing hardware. The mesh network includes a network of nodes each operative to transmit and/or receive directional beams containing packets of data. The memory hardware stores instructions that when executed on the data processing hardware cause the data processing hardware to perform operations. The operations include: receiving at least a first node connection from a network external to the data processing hardware; identifying an open first communication link between a first node and a second node of the network; determining a first recommended set of beam vectors to constrain a first scanning range of the first node when initiating beam forming with the second node; and transmitting the first recommended set of beam vectors to the first node. This aspect may include one or more of the following optional features. The network includes a network of nodes each operative to transmit and/or receive directional beams containing packets of data. The first recommended set of beam vectors cause the first node to execute beam forming training with the second node using the first recommended set of beam vectors to establish the first communication link with the second node.

The operations may further include obtaining locations of the first node and the second node from the memory hardware and determining the recommended first set of beam vectors based on the second node location relative to the first node location. The recommended first set of beam vectors may constrain the first scanning range of the first node to expedite beam forming alignment with the second node. The operations may further include obtaining a location of the first node and locations of a third node and a fourth node associated with a second communication link from the memory hardware and determining the recommended first set of beam vectors based on the first node location relative to the third node location and/or the fourth node location. The recommended first set of beam vectors may constrain the first scanning range of the first node to mitigate interference with the second communication link between the third node and the fourth node. The operations may also include obtaining a location of the first node and locations of a third node and a fourth node associated with a second communication link from the memory hardware determining the recommended first set of beam vectors based on the first node location relative to the third node location and/or the fourth node location and determining the recommended first set of beam vectors based on the antenna information. The antenna information may include at least one of a position of the antenna array, a geometry of the antenna array, an orientation of the antenna array, or an environment of the antenna array.

In some implementations, the first node executes beam forming training with the second node by: executing an initiator transmitter sector level sweep constrained by the first recommended set of beam vectors; receiving one or more responder directional beams while the second node executes a responder transmitter sector level sweep, the received responder directional beams indicating an optimal initiator beam vector received by the second node during the initiator transmitter sector level sweep; transmitting sector sweep feedback to the second node, the sector sweep feedback indicating an optimal responder beam vector received by the first node during the responder transmitter sector level sweep; and when a sector sweep acknowledgement is received from the second node, establishing the first communication link using the optimal initiator beam vector at the first node and the optimal responder beam vector at the second node. In some examples, at least one of the first node or the second node execute a receiver sector level sweep to determine an optimal receiving beam vector while the other one of the first node or the second node executes the corresponding one of the initiator transmitter sector level sweep or the responder transmitter sector level sweep, the established first communication link based on the optimal receiving beam vector associated with at least one of the first node or the second node.

When the second node is connected to the network and the data processing hardware, the system may include: obtaining a location of the first node from memory hardware in communication with the data processing hardware; determining a second recommended set of beam vectors based on the first node location to constrain a second scanning range of the second node when the first node initiates the beam forming with the second node; and transmitting the second recommended set of beam vectors to the second node, the second recommended set of beam vectors causing the second node to execute at least one of: the responder sector level sweep constrained by the second recommended set of beam vectors; or a receiver sector level sweep constrained by the second set of beam vectors while the first node executes the initiator transmitter sector level sweep. When the first communication link is established between the first node and the second node, the system may include receiving the optimal initiator beam vector and the optimal responder beam vector from at least one of the first node or the second node; and providing beam refinement protocol instructions to the first node and/or the second node based on the optimal initiator beam vector and the optimal responder beam vector. The beam refinement protocol instructions when received by the first node and/or the second node may cause a beam refinement protocol procedure to execute between the first node and the second node to optimize the first communication link.

In some examples, the operations include: when the first node is rediscovered after an intermittent disconnection from the network: receiving a connection request from the first node requesting connection to the previously established first communication link with the second node; obtaining locations and beam histories of the first node and the second node from memory hardware in communication with the data processing hardware; determining bootstrap beam forming instructions based on the locations and beam forming histories of the first and the second node; and transmitting the bootstrap beam forming instructions to the first node and the second node. The beam forming histories may indicate optimal initiator transmit and receive beam vectors and optimal responder transmit and receive beam vectors associated with the previously established first communication link. The bootstrap beam forming instructions when received by the first node and the second node causing the first node and the second node to: re-establish the first communication link using the optimal initiator transmit and receive beam vectors and the optimal responder transmit and receive beam vectors specified by the beam forming histories without executing a sector level sweep procedure between the first node and the second node; and execute a beam refinement protocol procedure to optimize the re-established first communication link.

In some implementations, the operations include when the first communication link is associated with a secondary route not scheduled for data transfer, instructing the first node and the second node to periodically execute a beam tracking procedure to maintain the first communication link while not in use. The operations may further include identifying a second communication link between a third node and a second node of the network. When the first communication link and the second communication link are outside an interference threshold, the system may include determining the first communication link and the second communication link will not interfere with each other and scheduling overlapping service periods over the first communication link and the second communication link without instructing any of the nodes associated with the first and second communication links to perform an interference assessment.

In some examples, the operations include when the first communication link and the second communication link are within the interference threshold, determining a propensity for interference between the first communication link and the second communication link. The operations may further include one of: determining beam tuning instructions for at least one of the nodes of the first communication link or the second communication link that causes the at least one node to adjust side lobe levels to mitigate the propensity for interference; instructing at least one of the nodes to perform an interference assessment; restricting the scheduling of overlapping service periods over the first communication link and the second communication link; or changing the frequency channel over at least one of the first communication link or the second communication link.

The operations may further include identifying a third node relative to the first node causing interference over the first communication link and obtaining locations and beam histories of the first node and the third node from the memory hardware. The beam forming histories may indicate beam vectors used by the first node and the third node. The operations may also include determining beam turning instructions for the first node based on the first and third node locations and beam forming histories and transmitting the beam tuning instructions to the first node, the beam tuning instructions when received by the first node causing the first node to adjust side lobe levels, or otherwise modify its beam, to mitigate the interference over the first communication link. Each node of the network may include a media access control layer configured to facilitate communication with one or more other nodes of the network and an application software layer in communication with the associated media access control layer and configured to facilitate communication with the data processing hardware.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
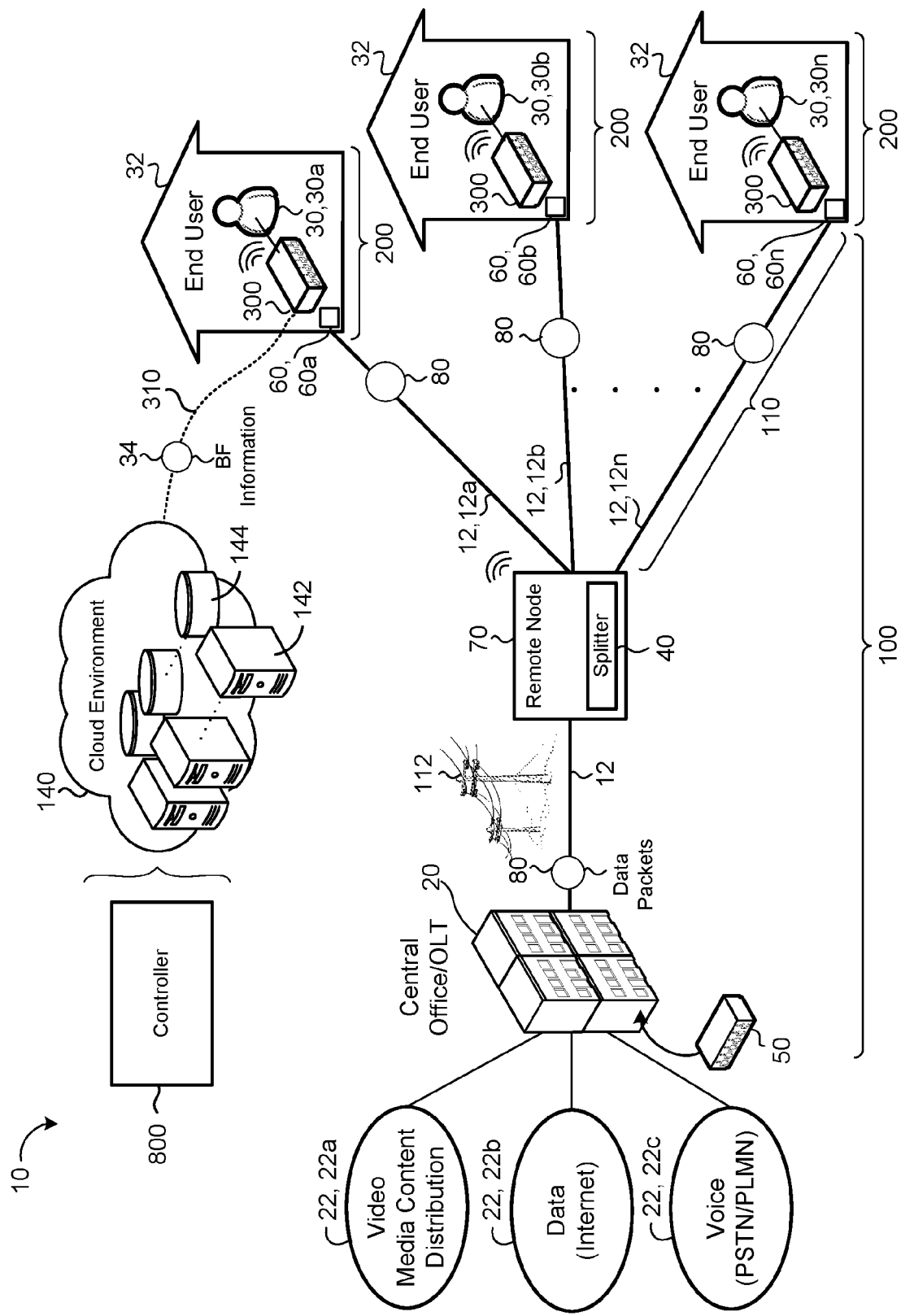
FIGS. 1A and 1B are schematic views of an exemplary network system.
Figure 1B:
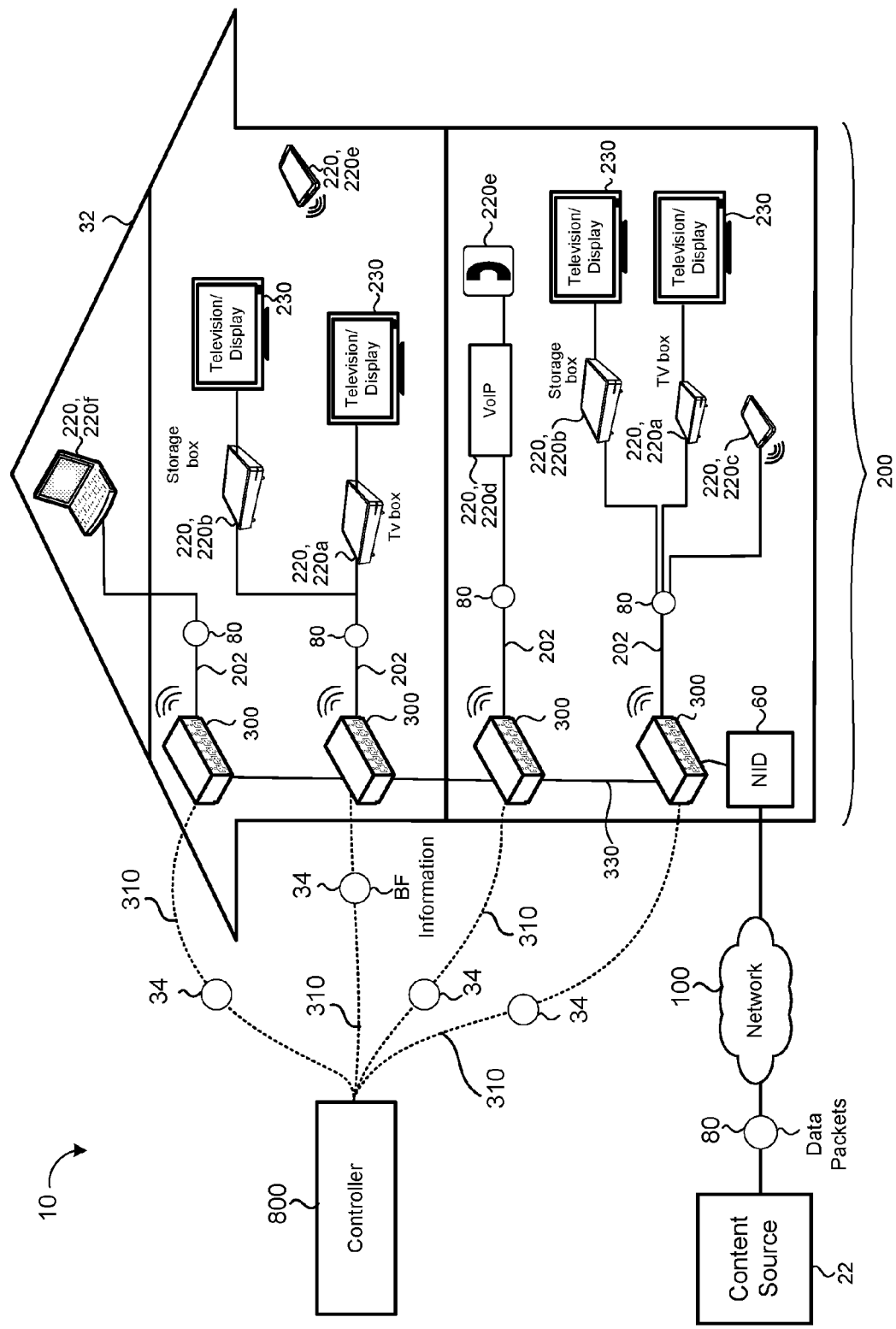

Referring to FIGS. 1A and 1B, in some implementations, a network system 10 includes a provider network 100 in communication with one or more residential networks 200 and a remote system 140. The remote system 140 may be a distributed system (e.g., cloud environment) having scalable/elastic resources that include computing resources (e.g., data processing hardware) 142 and/or storage resources (e.g., memory hardware) 146.

The provider network 100 may include an optical network 100 (e.g., a passive optical network (PON) or a Gigabit-capable PON (GPON)) from a central office (CO) 20 (or optical line terminal (OLT)). Fiber-to-the home (FTTH) is the delivery of a communication signal through optical fibers 12, 12a-n over the optical network 100 from a central office (CO) 20 to the residential network 200 associated with a customer premises 32 (or structure) of a user 30 (also referred to as a customer). A passive optical network (PON) 100 is a point-to-multipoint network architecture that uses optical splitters 40 to enable a single optical fiber feeder 12 to serve multiple users 30a-30n (e.g. 16-128). Although the optical network 100 is described with respect to a passive optical network, an active optical network (AON) may be used as well.

The optical network 100 provides the optical fibers 12 for sending packets 80 of data from the CO 20 that includes an optical line terminal (OLT) 50 (e.g., optical transmitter/receiver or transceiver) to a number of network interface terminals (NITs) 60. In some examples, the NITs 60 include optical network units/terminals (ONTs) 60. The CO 20 receives data from a content source 22, such as video media distribution 22a, internet data 22b, and voice data 22c, that may be transferred as packets 80 of data to the end users 30. Each NIT 60 may include an optical transmitter/receiver (i.e., transceiver) for transmitting and receiving data packets 80 from the CO 20. The NIT 60 may be a media converter that converts fiber-optic light signals to electric signals for communication over copper wires (e.g. Ethernet lines). In some examples, the optical network 100 includes multiple optical transmitter/receiver or transceiver systems 50, 60. One optical fiber 12 is sent from the CO 20 to a remote node 70, where the signal is split and distributed to many (e.g., 16, 205 or more) different NITs 60a-60n via optical fibers 12, 12a-12n. Multiple remote nodes 70 may split the signal. In some implementations, power lines 112, such as 110 VAC electric lines or from commonly available Cable Television 9CATV) power supply lines, route the optical fibers 12 and provide power.

The examples show the OLT 50 as the endpoint of the optical network 100 by converting electrical signals used by equipment of a service provider to/from fiber-optic signals used by the optical network 100. In addition, the OLT 50 coordinates multiplexing between the conversion devices at the user end 30. The OLT 50 sends the fiber optic signal through a feeder fiber 12, and the signal is received by a remote node 70, which demultiplexes the signal and distributes it to multiple users 30.

The NIT 60, on the user end, converts an optical signal routing the packets 80 of data received from the OLT 50 (over the passive optical network 100) into an electrical signal and provides Layer 2 media access control functions for the residential network 200 associated with the end-user 30. The NIT 60 therefore functions as a media converter, converting the optical signal to an electrical signal, such as an Ethernet signal.

In some implementations, the residential network 200 is a mmWave mesh network including a meshed-based network of nodes 300 (e.g., routers directing packets 80 of data along one or more wireless communication links 330). The mesh network 200 may include a personal area network (PAN), a local area network (LAN), a campus area network (CAN), or a metropolitan area network (MAN). The nodes 300 may wirelessly communicate with one another using IEEE 802.11ad (hereinafter "802.11ad") technology to transfer the packets 80 of data in multiple hops over the communication links 330. Accordingly, the nodes 300 of the mesh network 200 facilitate the transfer of data packets 80 from a source 210 (FIG. 2) to a destination 220 (e.g., electronic device) associated with the user 30. The nodes 300 may be equipped with multiple Internet protocol (IP) interfaces. In some implementations, the NIT 60 is integrated with one of the nodes 300 as a single optical network-residential gateway device of the residential network 200. The nodes 300 may wirelessly communicate with one another via 802.11ad technology through the connected (e.g., established) communication links 330 to offer Wi-Fi throughout the mesh network 200. Therefore, the nodes 300 serve as routers to provide the packets 80 of data over multiple hops from the source 210 to the devices 220 located within a limited area 32 (e.g., house, office building, etc.).

In some implementations, the mesh network 200 is a local area network (LAN) (e.g., a home area network (HAN)) that facilitates communication and interoperability among electronic devices 220 within a limited area 32, such as a home, school, or office of the user 30. An electronic device 220 may be a TV box 220a, a storage box 220b, a tablet 220c, a voice-over-internet protocol (VoIP) device 220d, a phone or smartphone 220e, a computer 220f (or a laptop, a portable electronic device), etc., each of which may be connected via Wi-Fi or have a wired connection 202 to one or more nodes 300.

The IEEE 802.11 standard (hereinafter "802.11s") supports multi-hop mesh topologies for nodes having interoperable media access control (MAC) and physical (PHY) layers associated with broadcasting channel environments, such as 802.11a/b/g/n/ac. Nodes using the 802.11s technology each operate in a station mode (e.g., STA) and contend for access to resources by exploiting the broadcasting nature of the channel environments. Nodes using the 802.11ad technology, however, do not include a broadcasting nature and communicate with an access point (AP) or personal basic service set (PBSS) control point (PCP) located within the network 100 to coordinate access to the medium. The AP/PCP acts as a supervisor to inform each STA of opportunities to communicate with the AP/PCP or with other STAs. Thus, wireless chipsets implementing the 802.11ad standard do not support multi-hop mesh topologies due to their interoperable MAC/PHY layers 306 (FIG. 3) providing a channel environment through directional beaming. As a result, the MAC/PHY layers 306 for nodes 300 using 802.11ad technology do not communicate directly with an AP/PCP located within the network 200 to coordinate wireless communication between the nodes 300. Instead, the functionality of the AP/PCP resides within the remote system 140 to facilitate the formation, management, and routing of packets 80 through multi-hop mmWave mesh topologies.

Complementary metal-oxide-semiconductor (CMOS) wireless chipsets implementing the 802.11ad standard are engineered with a focus on short-range mobile communications. This focus on short-range communication ultimately shaped the design of firmware including protocol, algorithms, memory space for beam forming codebooks 374 (FIG. 3) employed by the CMOS wireless chipsets when executing beam forming operations. For instance, a node 300 using 802.11ad technology includes a beam forming configuration 370 intended for short-range communications that covers an entire scanning range (e.g., transmitting scan range 372 (FIG. 3) and/or receiving scan range 374 (FIG. 3) of an antenna array 308 (FIG. 3), since the orientation of the node 300 and a location of other nodes 300 is not known a priori. However, for larger antenna arrays needed for long-range communication, the number of beams required to be scanned to cover the same scan range increases, resulting in increases to the overhead in beam forming operations and beam forming training needed to establish a long-range communication link 330 between two nodes 300. As a result, the nodes 300 using 802.11ad technology are equipped with protocol, algorithms and memory space allocated for beam forming configurations 370 that are unsuitable for use in high-bandwidth backhaul applications that require long-range stationary communication.

In some implementations, the nodes 300 of the mesh network 200 establish node connections 310 with the remote system 140 through the provider network 100 or other communications. In some examples, the remote system 140 executes a controller 800 that manages end-to-end routing of traffic (e.g., data packets 80) through the mesh network 200 based on conditions of the mesh network 200. For example, the controller 800 may identify one or more routes 201, 202 (FIG. 2) through the mesh network 200 for routing data packets 80, identify one or more communication links 330 between pairs of nodes 300 along the identified routes 201, 202, and determine beam forming (BF) information 34 for one or more of the nodes 300 to use when forming a long-range communication link 330 with another node, maintaining the long-range communication link 330, and/or mitigating network interference levels over the long-range communication link 330. Using the node connections 310, the controller 800 dynamically provides the BF information 34 to one or more of the nodes 300 to update or revise the configurations 370 associated therewith to carry out long-range beam forming operations orchestrated by the controller 800.

Figure 2:
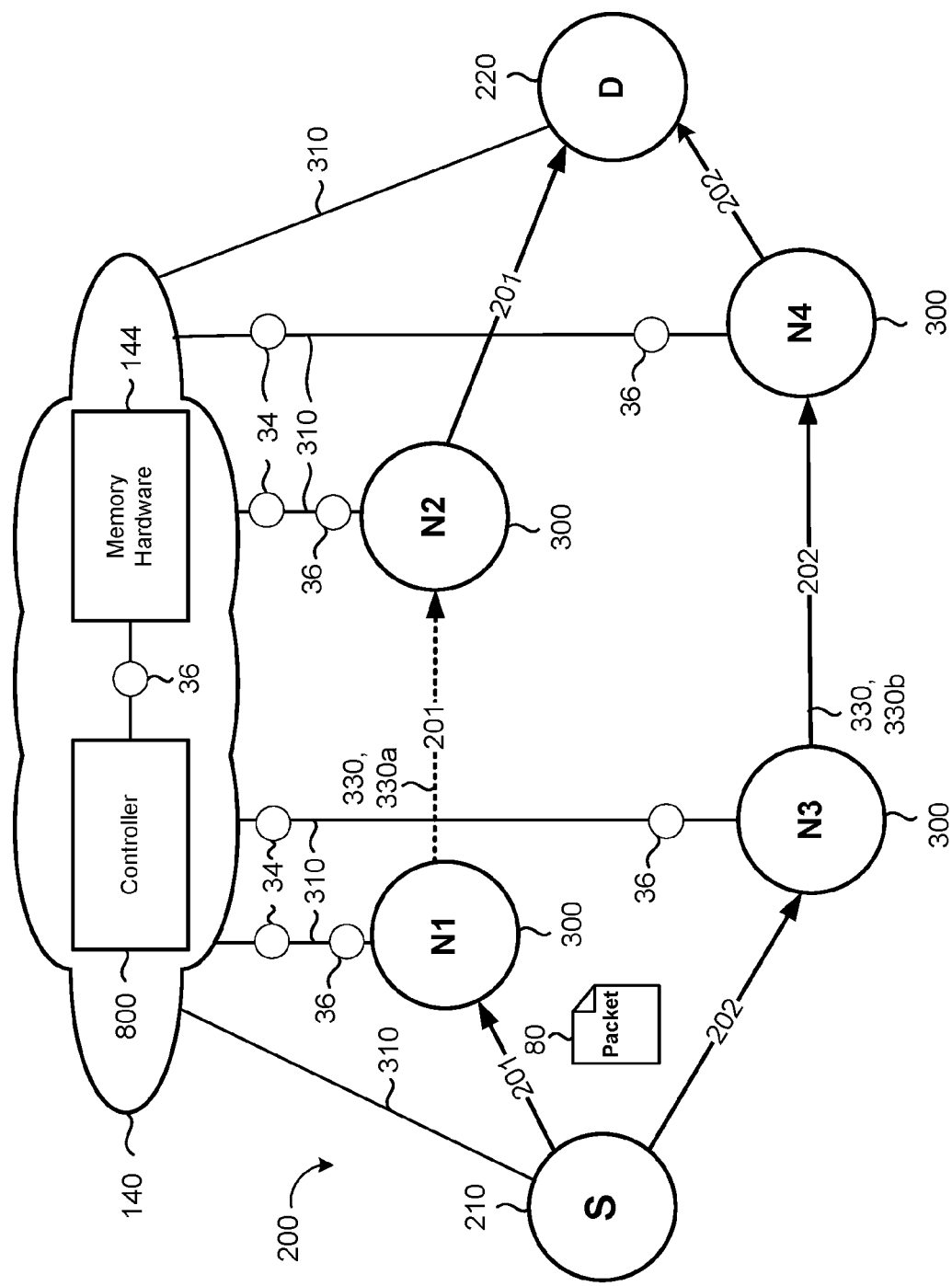
FIG. 2 is a schematic view of an exemplary network system including a network and a cloud-based controller that provides beam forming information to one or more nodes in the network.

Referring to FIG. 2, in some implementations, the controller 800 executing on the remote system 140 (e.g., the cloud) receives one or more node connections 310 from a network 200 (e.g., multi-hop mmWave mesh network) external to the remote system 140. The network 200 includes a network of nodes 300 (N1-N4), each operative to transmit and/or receive directional beams containing packets 80 of data. The nodes 300 include IEEE 802.11ad wireless chipsets and operate in the STA mode. The network 200 does not include an AP/PCP that communicates with the nodes 300 to inform the nodes 300 when to communicate with one another. Instead, the AP/PCP functionality resides within the controller 800 executing on the remote system 140 (e.g., cloud environment) to enable the controller 800 to identify one or more routes 201, 202 within the network 200 for providing a data packet 80 from the source 210 to the destination 220. The controller 800 may identify other routes (not shown) within the mesh network 200 for providing packets 80 of data from other sources 210 (not shown) to other destinations 220 (not shown). The controller 800 also identifies one or more communication links 330 between communicating pairs of nodes 300 along each route 201, 202. The controller 800 may use some of the nodes 300 for point-to-multipoint communications, and thus, one or more of the nodes 300 of the network 200 may be associated with two or more communication links 330. In some implementations, each communication link 330 is a long-range communication link and each node 300 is static. The source 210 may include an originating node 300 or may include the NIT 60 (FIGS. 1A-1B) and the destination 220 may include an end recipient electronic device 220a-n of the data packet 80. The destination 220 may also correspond to a terminating node 300 along the identified route 201, 202.

FIG. 2 shows the controller 800 identifying the first route 201 including the source S 210, the first node N1 300, the second node N2 300, and the destination D 220. The controller 800 also identifies the second route 202 including the source S 210, the third node N3 300, the fourth node N4 300, and the destination D 220. In some examples, the controller 800 identifies the first route 201 as a primary communication route to facilitate a majority of the data transport between the source S 210 and the destination D 220. The controller 800 may also identify the second route 202 as a secondary communication route for sporadic and/or short-term data transport scheduling between the source S 210 and the destination D 220 when needed.

The controller 800 utilizes the node connections 310 to provide the BF information 34 to the nodes N1-N4 and to receive node information 36 from the nodes 300. The controller 800 may store the received node information 36 in memory hardware 144 in communication with the controller 800. In some implementations, the controller 800 obtains (e.g., retrieves) the stored node information 36 associated with one or more of the nodes 300 from the memory hardware 144 to determine the BF information 34 provided to one or more of the nodes 300. For instance, when the controller 800 identifies an open first communication link 330, 330a (denoted by dashed line) between the first node N1 300 and the second node N2 300, the BF information 34 provided to the first node N1 300 may specify a restricted transmitting scanning range 373 (FIG. 4B) and instruct the first node N1 300 to execute a transmitting sector level sweep (SLS) procedure using the restricted transmitting scanning range 373 to close/establish the first communication link 330 with the second node N2 300. Similarly, the BF information 34 provided to the second node N2 may specify a restricted receiving scanning range 375 (FIG. 4C) and instruct the second node N2 300 to execute a receiving SLS procedure using the restricted receiving scanning range 375 to discover one or more directional beams transmitted from the first node N2 300 during the transmitting SLS.

Figure 3:
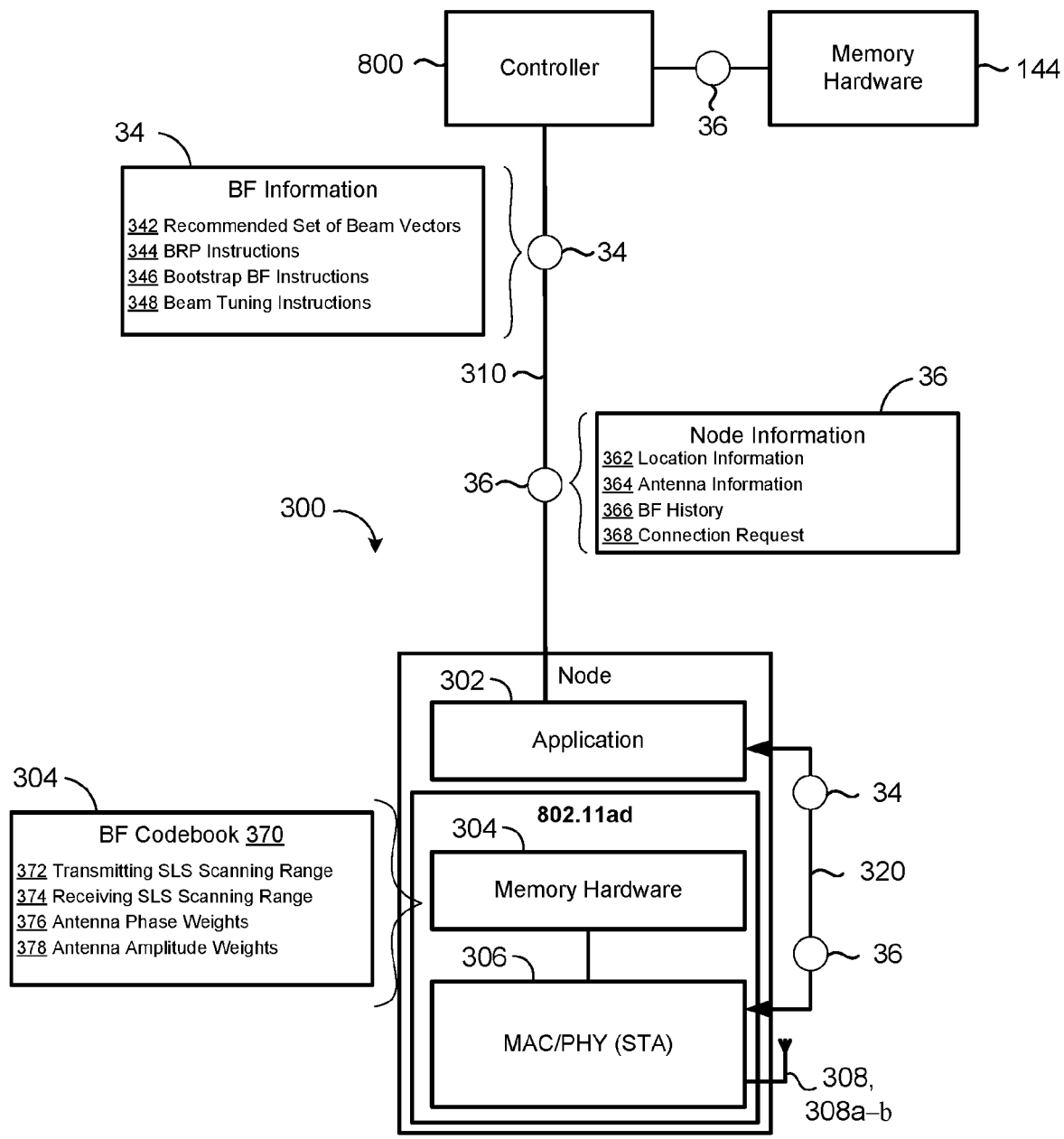
FIG. 3 is a schematic view of example components of an exemplary node in communication with a cloud-based controller.

Referring to FIG. 3, in some implementations, each node 300 includes a software application layer 302 (e.g., host), memory hardware 304, and an interoperable MAC/PHY layer 306. The MAC/PHY layer 306 may include two layers each associated with a corresponding one of the MAC layer or the PHY layer. A driver, the memory hardware 304, and the MAC/PHY layer 306 may reside on a Wi-Fi chipset using 802.11ad technology. The software application layer 302 (hereinafter "application layer") facilitates wireless node-to-controller communications via the node connection 310 to enable the controller 800 to transmit the BF information 34 and receive the node information 36 to and from the associated node 300.

The controller 800 determines the BF information 34 and transmits the BF information 34 to the application layer 302 of the associated node 300. The BF information 34 may include one or more recommended sets of beam vectors 342, Beam Refinement Protocol (BRP) instructions 344, bootstrap BF instructions 346, and/or beam tuning instructions 348. In some examples, the controller 800 determines the recommended set of beam vectors 342 to constrain a transmitting and/or receiving scanning range of the associated node 300 when executing a transmitting and/or receiving SLS.

The application layer 302 forwards the BF information 34 received from the controller 800 to the MAC/PHY layer 306 and/or the memory hardware 304 while the node 300 operates in the STA mode. For instance, a communication path 320 may provide the BF information 34 from the application layer 302 to the MAC/PHY layer 306. The MAC/PHY layer 306 facilitates node-to-node communications to enable the associated node 300 to perform beam forming and beam training procedures based on the BF information 34 received from the controller 800 to establish and/or maintain long-range communication link(s) 330 with one or more other nodes 300. When the communication link 330 is established, the controller 800 may schedule data transfers over the communication link 330. The MAC/PHY layer 306 includes one or more antennas 308, 308a-b to transmit a directional beam 380 (FIG. 4B) to one or more designated nodes and/or receive a directional beam 390 (FIG. 4C) from one or more other nodes. In some examples, the MAC/PHY layer 306 includes an antenna array 308 of two or more antennas 308a, 308b to form the directional beams. The MAC/PHY layer 306 may use the recommended set of beam vectors 342, 34 from the controller 800 for executing BF training with a receiving node to determine an optimal transmitting beam vector 382 (FIG. 4B) that establishes the communication link 330 with the receiving node. In some examples, the MAC/PHY layer 306 may use the BRP instructions 344, 34 from the controller 800 for executing a BRP procedure with the other node 300 to optimize the established communication link 330 therebetween.

In some examples, the application layer 302 and/or the MAC/PHY layer 306 updates/revises the BF configurations 370 stored in the memory hardware 304 of the associated node 300. The BF configuration 370 may include beam forming codebooks (e.g., BF codebook), algorithms, protocols, and control messaging intended for short-range communication. For instance, the BF configuration 370 may include, but is not limited to, a transmitting SLS scanning range 372, a receiving SLS scanning range 374, antenna phase weights 376, and/or antenna amplitude weights 378. In some examples, the recommended set of beam vectors 342 received from the controller 800 updates the BF configuration 370 by constraining the transmitting SLS scanning range 372, thereby causing the MAC/PHY layer 306 to execute a transmitter SLS over a restricted scan range 373 based on the recommended set of beam vectors 342.

In some implementations, the MAC/PHY layer 306 forwards the node information 36 to the application layer 302 via the communication path 320, and the application layer 302 provides the node information 36 to the controller 800 via the node connection 310. The controller 800 may store the node information 36 in the memory hardware 144 and use the node information 36 for determining the BF information 34 during a future operation. The node information 36 may include, but is not limited to, location information 362, antenna information 364, a BF history 366, and/or a connection request 368. In some examples, the location information 362 indicates a location of the associated node 300 within the network 200. Additionally or alternatively, the location information 362 may indicate a location of each node it shares a communication link 330 with and/or locations of other nodes in close proximity of the node 300. The antenna information 364 may include an array geometry, position, orientation, and/or environment of each antenna (e.g., antenna array) 308 associated with the node 300. The BF history 366 may include an optimal transmitting beam vector 382 and/or an optimal receiving beam vector 392 (FIG. 4C) obtained by the node 300 during a receiving/transmitting SLS procedure and used for establishing a communication link 330. The BF history 366 may also include a BRP procedure executed by the node 300 for optimizing a communication link 330 with another node. Moreover, the BF history 366 may indicate antenna phase and/or amplitude weights used by the nodes 330 to communicate over the communication link 330. The connection request 368 corresponds to the associated node 300 requesting connection to one or more previously established communication links 330 with other nodes 300.

The controller 800 and/or the application layer 302 of each node 300 may structure beacon intervals in terms of what periods are present and which nodes 300 (operating in the STA mode) are given allocations for wireless communication during the appropriate periods. Moreover, the controller 800 and/or the software application layer 302 of each node 300 provide spectrum management for the identified route 201, 202 by selecting appropriate channels, mitigating interference, and/or providing time and spatial management of radio resource utilization across the mesh network 200. On the other hand, the MAC/PHY layer 306 of each node 300 may be responsible for link adaptation, including adapting a modulation structure (MCS) used and beam tracking based on the channel condition. Moreover, the MAC/PHY layer 306 of each node 300 may implement a contention-based access period (CBAP) procedure when the associated node 300 is contending with other nodes 300 for access to the network 200 during a particular period allocated by the controller 800. Accordingly, the controller 800 and application layer 302 optimize the end-to-end routing of traffic based on network conditions, while the MAC/PHY layer 306 rapidly adapts the communication links 330 based on changing channel conditions without the latency of centralizing these functions at the controller 800.

Figure 4A:
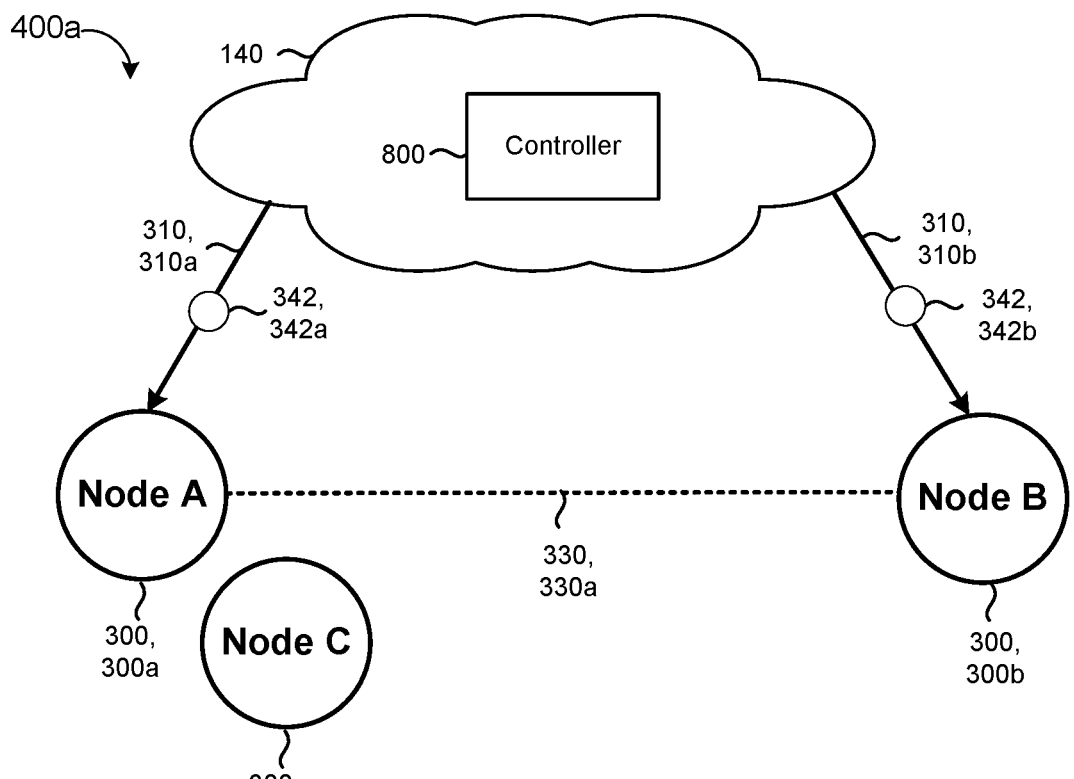
FIG. 4A is a schematic view of a controller providing beam forming information to a first node and a second node connected to a network.

Referring to FIG. 4A, schematic view 400a shows the controller 800 identifying an open first communication link 330a between a first node (Node A) 300a and a second node (Node B) 300b. The dashed line indicates the first communication link 330a is open, and thus not established. FIG. 4A also shows a third node (Node C) 300c near the first node 300a. The controller 800 may instruct the first node 300a to initiate beam forming with the second node 300b to establish/close the first communication link 330a. The controller 800 determines a first recommended set of beam vectors 342, 342a to constrain a transmitting scanning range 372 (e.g., specified by the configuration 370) of the first node 300a when initiating beam forming with the second node 300b. Additionally or alternatively, the controller 800 may determine a second recommended set of beam vectors 342, 342b to constrain a receiving scanning range 374 of the second node 300b when the first node 300a initiates beam forming with the second node 300b. Thereafter, the controller 800 transmits the first recommended set of beam vectors 342a to the first node 300a via the first node connection 310a and the second recommended set of beam vectors 342b to the second node 300b via the second node connection 310b.

In some examples, the controller 800 obtains locations (e.g., location information 362) of the first node 300a and the second node 300b from the memory hardware 144 and determines the first recommended set of beam vectors 342a based on the second node 300b location relative to the first node 300a location. Here, the first recommended set of beam vectors 342a are operative to constrain the transmitting SLS (T-SLS) scan range 372 (FIG. 4B) of the first node 300a to expedite BF alignment with the second node 300b. Additionally or alternatively, in some scenarios, the controller 800 obtains locations (e.g., location information 362) of the first node 300a and the third node 300b from the memory hardware 144 and determines the first recommended set of beam vectors 342a based on the first node 300a location relative to the third node 300c location. Here, the first recommended set of beam vectors 342a are operative to constrain the T-SLS scan range 372 of the first node 300a to mitigate interference with the third node 300c. The controller 800 may also obtain antenna information 364 associated with the antenna array 308 of the first node 300a from the memory storage hardware 144 and determine the first recommended set of beam vectors 342a based on the antenna information 364.

Figure 4B:
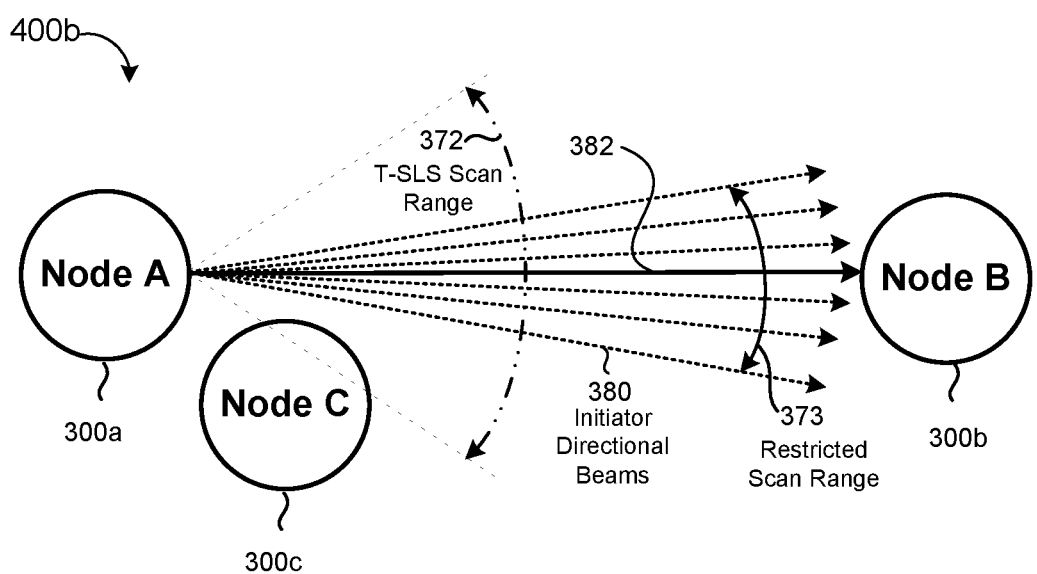
FIG. 4B is a schematic view of a first node transmitting initiator directional beams during a transmitting sector level sweep using a restricted initiator transmitting scan range.

Referring to FIG. 4B, the first recommended set of beam vectors 342a received by the first node 300a cause the first node 300a to execute BF training with the second node 300a using the first recommended set of beam vectors 342a. Specifically, FIG. 4B shows the first node 300b executing BF training with the second node 300b by executing an initiator T-SLS constrained by the first recommended set of beam vectors 342a. For instance, the initiator T-SLS scan range 372 specified by the configuration 370 of the first node 300a is constrained by the first recommended set of beam vectors 342a to provide initiator directional beams 380 across a restricted scan range 373. The restricted scan range 373 does not interfere with the third node 300c and is also more adept in providing the initiator directional beams 380 toward the location of the second node 300b to determine an optimal initiator beam vector 382 received by the second node 300b during the initiator T-SLS. In some examples, the second node 300b executes a receiver SLS (R-SLS) during the initiator T-SLS to capture one or more of the initiator directional beams 380 from the first node 300a. In some scenarios, the second recommended set of beam vectors 342b received by the second node 300b are operative to constrain the R-SLS executing by the second node 300b to provide a restricted scan range that enables the second node 300b to listen for the initiator directional beams 380 from the first node 300a based on the first node 300a location.

Figure 4C:
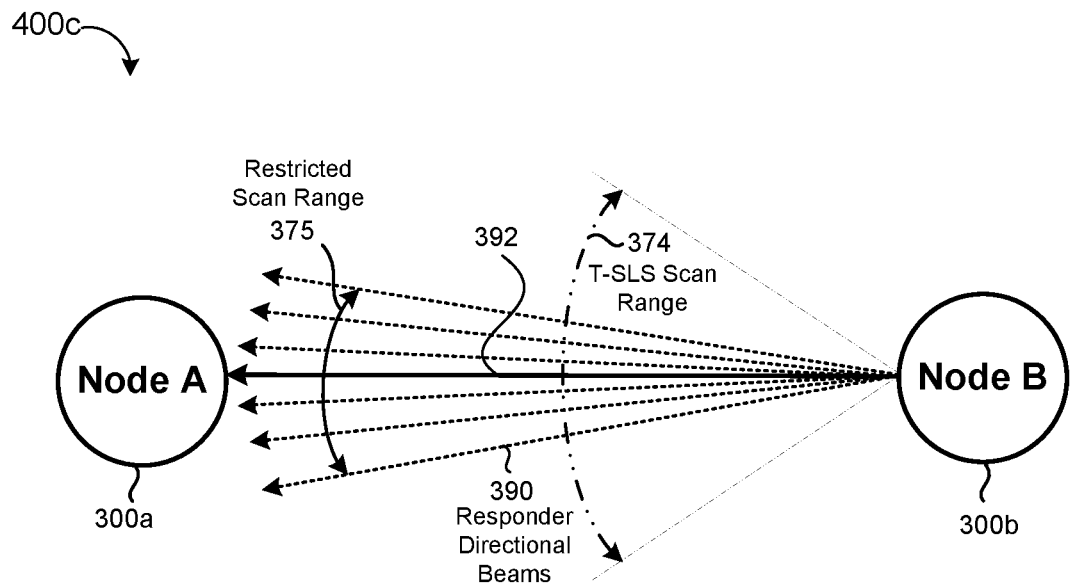
FIG. 4C is a schematic view of a second node transmitting responder directional beams during a responder transmitter sector level sweep using a restricted responder transmitting scan range.

Referring to FIG. 4C, the second recommended set of beam vectors 342b received by the second node 300b cause the second node 300b to execute a responder T-SLS after second node executes the R-SLS during the initiator T-SLS.

For instance, a responder T-SLS scan range 374 specified by the configuration 370 of the second node 300b is constrained by the second recommended set of beam vectors 342b to provide responder directional beams 390 across a restricted scan range 375 that is directed toward the location of the first node 300b. Thereafter, the first node 300a receives one or more of the responder directional beams 390 indicating the optimal initiator beam vector 382 received by the second node 300b during the initiator T-SLS (FIG. 4B). In response to receiving the one or more responder directional beams 390 from the second node 300b, the first node 300a may transmit sector sweep feedback to the second node 300b indicating an optimal responder beam vector 392 used by the second node 300b while executing the responder T-SLS, and when the first node 300a receives a sector sweep acknowledgement from the second node 300b, the first communication link 330a is established using the optimal initiator beam vector 382 and the optimal responder beam vector 392. In some examples, the first node executes a R-SLS while the second node 300b executes the responder T-SLS and the responder repeats its T-SLS to account for/allow the initiator to make its R-SLS. In some implementations, the initiator T-SLS includes information about the R-SLS it will do while the responder does its T-SLS to inform the responder of how many repetitions of its T-SLS are needed. Here, the first recommended set of beam vectors 342a may constrain the scan range of the R-SLS associated with the first node 300a.

In some implementations, the first node 300a and the second node 300b each execute the R-SLS and determine an associated optimal receiving beam vector for receiving the directional beams 380, 390 from the other one of the first node 300a or the second node 300b. The first communication link 330a may be established using at least one of the optimal receiving beam vector associated with the first node 300a, the optimal receiving beam vector associated with the second node 300b, the optimal initiator beam vector 382, or the optimal responder beam vector 392.

Figure 4D:
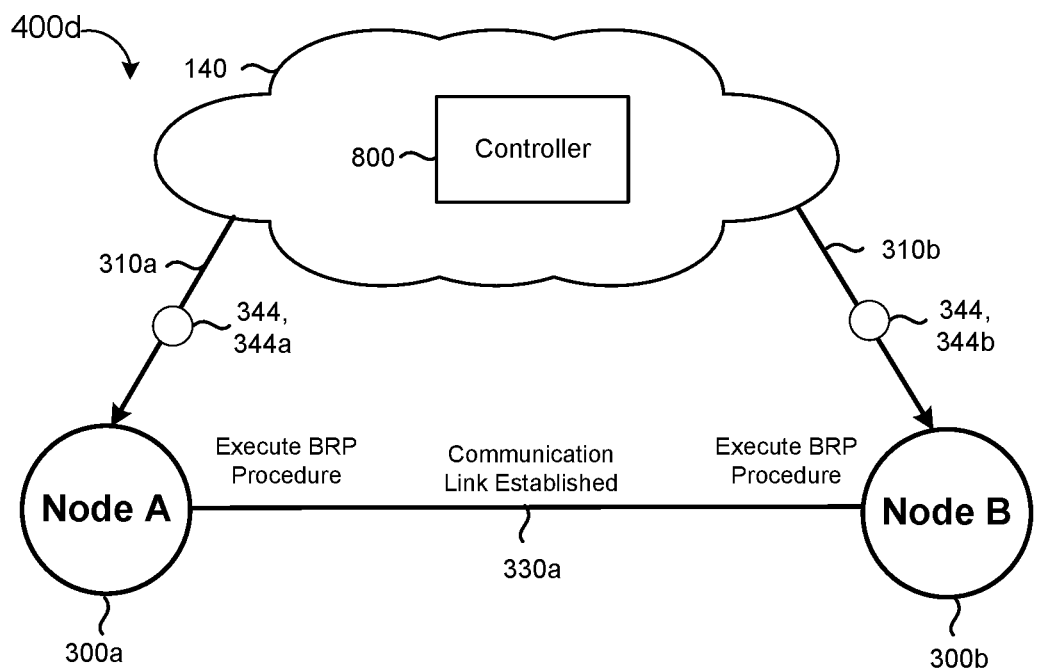
FIG. 4D is a schematic view of a controller instructing a first node and a second node to execute a beam refinement protocol procedure to optimize a communication link.

In some implementations, when the first communication link 330a is established between the first node 300a and the second node 300b, the controller 800 receives BF history information 366, 36 including the optimal responder beam vector 392 and the optimal initiator beam vector 382 from one or both of the nodes 300a, 300b via the node connection(s) 310a, 310b. Referring to FIG. 4D, in some implementations, the controller 800 provides BRP instructions 344, 344a-b to the first node 300a and/or the second node 300b based upon the optimal responder beam vector 392 and the optimal initiator beam vector 382. The BRP instructions 344 when received by the first node 300a and/or the second node 300b causes a BRP procedure to execute between the first node 300a and the second node 300b to optimize the first communication link 330a.

Figure 4E:
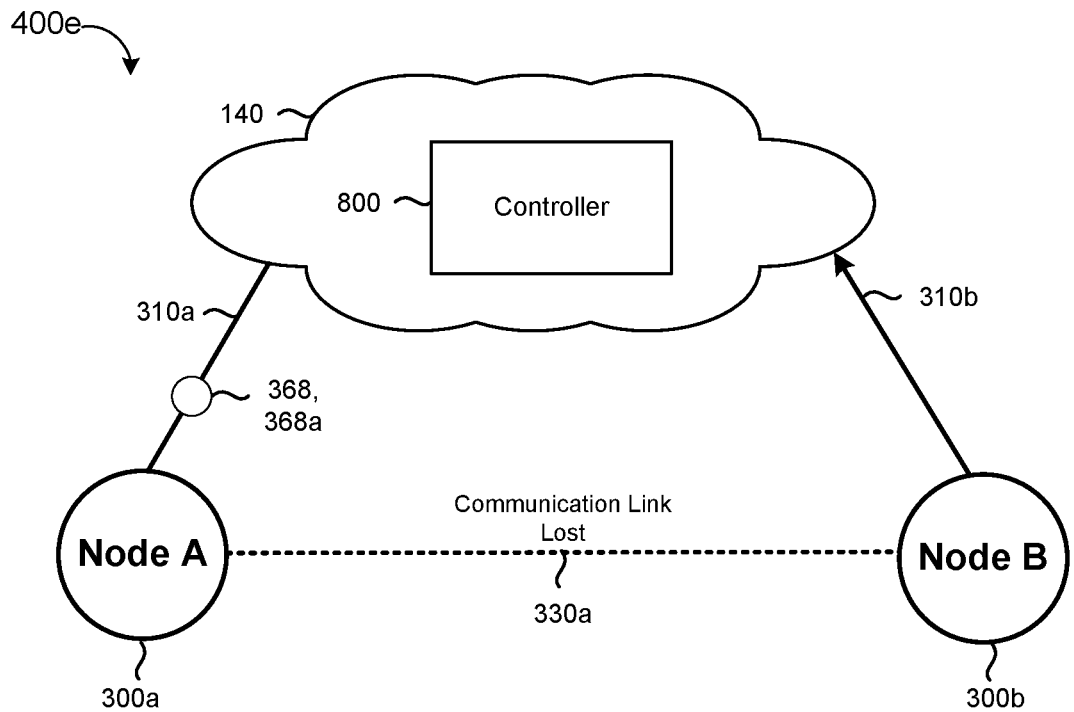
FIG. 4E is a schematic view of a first node transmitting a connection request to a controller for re-establishing a communication link associated with the first node.
Figure 4F:
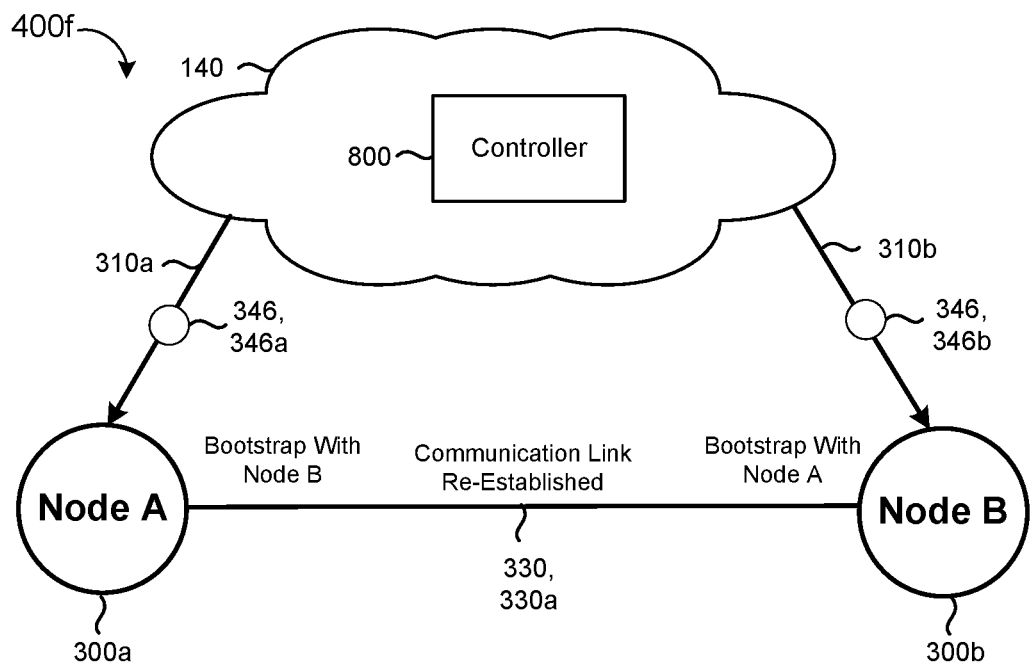
FIG. 4F is a schematic view of a controller instructing a first node and a second node to execute a beam forming bootstrap procedure to re-establish a communication link.

Referring to FIG. 4E, in some implementations, the first node 300a re-connects to the network 200 after an intermittent disconnection. As a result, the first communication link 330a between the first node 300a and the second node 300b is lost. When the first node 300a is rediscovered, the controller 800 receives a connection request 368, 368a, from the first node 300a requesting connection to the previously established first communication link 330a with the second node 300b. In some examples, the controller 800 obtains the BF histories 366 of the first node 300a and the second node 300b from the memory hardware 144. The BF histories 366 may include the optimal initiator and responder beam vectors 382, 392 associated with the first communication link 330a. The controller 800 also obtains the location information 362 including the first node 300a location and the second node 300b location from the memory hardware 144. Using the location information 362 and the BF histories 366, FIG. 4F shows the controller 800 determining and transmitting bootstrap BF instructions 346a, 346b to the nodes 300a, 300b via the node connections 310a, 310b for re-establishing the first communication link 330a without requiring the first node 300a and the second node 300b to execute the BF training procedures set forth above in FIGS. 4A-4C. Specifically, when the first node 300a and the second node 300b receive bootstrap BF instructions 346a, 346b, the first node 300a and the second node 300b re-establish the first communication link 330a using the optimal initiator and responder beam vectors 382, 392 (and/or the optimal receiving beam vectors associated with the nodes 300a, 300b) specified by the BF histories 366 and subsequently execute a BRP procedure to optimize the re-established first communication link 330a without executing the T-SLS procedure or the R-SLS procedure. In some implementations, when the first communication link 330a is associated with a secondary route not scheduled for data transfer, the controller 800 provides BF information 34 that instructs the first node 300a and the second node 300b to periodically execute a beam tracking procedure to maintain the first communication link 330a while not in use to provide robustness in case the link 330a is needed.

Figure 5:
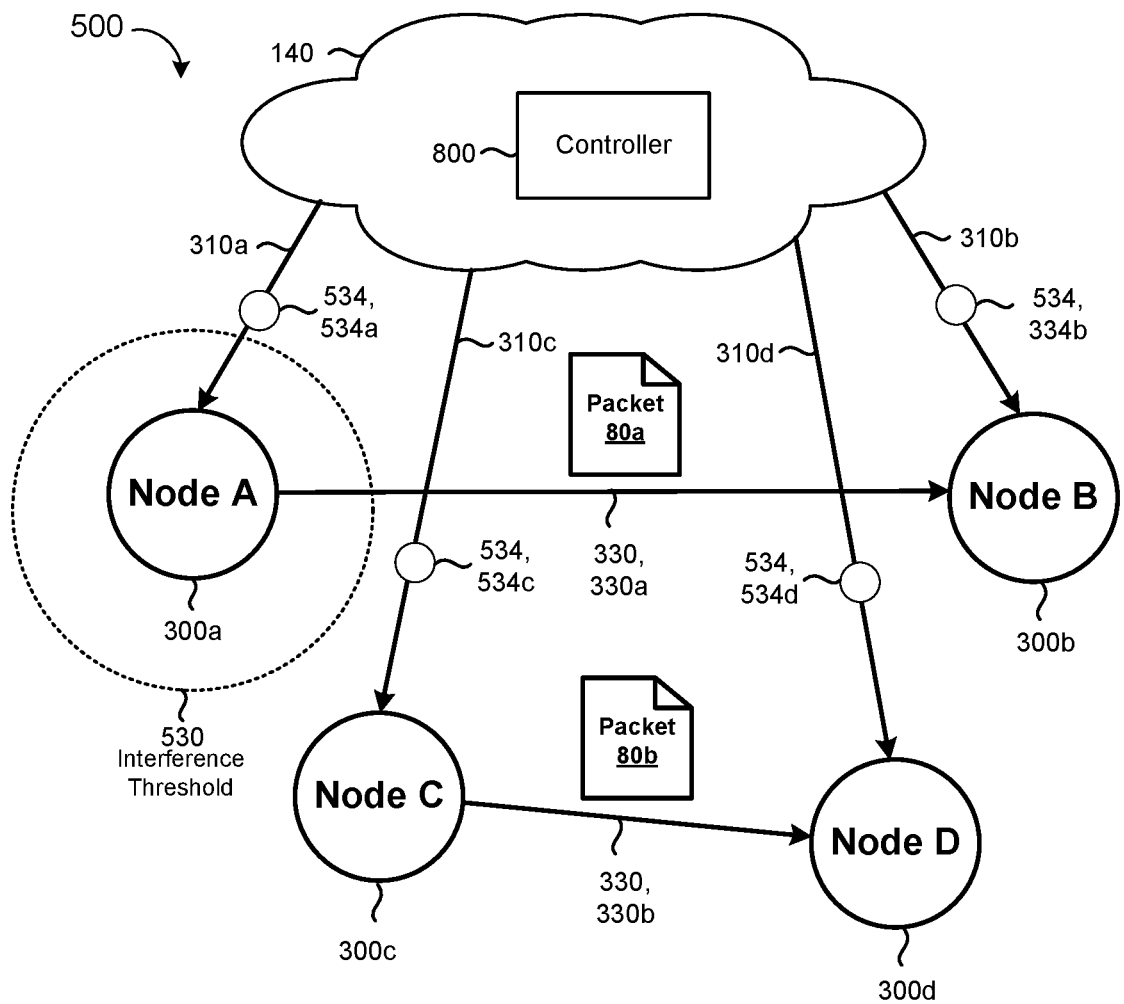
FIG. 5 is a schematic view of a controller scheduling overlapping service periods for data transfer over a first communication link and a second communication link.

Referring to FIG. 5, in some implementations, the controller 800 identifies the first communication link 330a between the first node 300a and the second node 300b and a second communication link 330b between a third node 300c and a fourth node 300b. To allow for overlapping or concurrent service periods on the same frequency channel along the first and second communication links 330a, 330b, the controller 800 must ensure that the links 330a, 330b will not interfere with one another. While the controller 800 can instruct the nodes 300a-d to conduct interference assessment tests to measure interference within their environments, the controller 800 may use known locations of the nodes 300 to determine whether or not the links 330a, 330b are susceptible to interfering with one another. In other words, when the controller 800 determines two nodes 300a, 300c associated with respective communication links 330a, 330b are located far enough away from each other, the controller 800 attains a certainty that the two nodes 300a, 300c will not interfere with one another. In some examples, when the first node 300a location relative to the third node 300c location is outside an interference threshold 530, the controller 800 determines the first communication link 330a and the second communication link 330b will not interfere with one another, and therefore permits scheduling of overlapping service periods over the first communication link 330a and the second communication link 330b without requiring the node(s) 300 to perform interference assessment testing. In these scenarios, the controller 800 transmits scheduling information 534, 534a-d to the respective nodes 300a-d specifying service periods where the nodes 300a-d operate to transmit or receive a data packet 80a, 80b along the associated communication link 330a, 330b.

If on the other hand, the first node 300a location relative to the third node 300c location is within the interference threshold 530, the controller 800 may require the nodes 300a, 300c to perform an interference assessment test or may decide not to allow overlapping service periods on the same frequency channel for data transfer. The controller 800 may also transmit beam tuning instructions 348 to at least one of the nodes 300 to mitigate interference by null steering or adjusting side lobe levels that emit from the at least one node 300 during beam transmissions. Here, the beam tuning instructions 348 dynamically adjust the antenna phase weights 376 and/or antenna amplitude weights 378 used by the at least one of the nodes 300 or may provide a set of beam forming vectors to employ by at least one of the nodes 300 all of which have desirable interference properties for the second link.

Figure 6A:
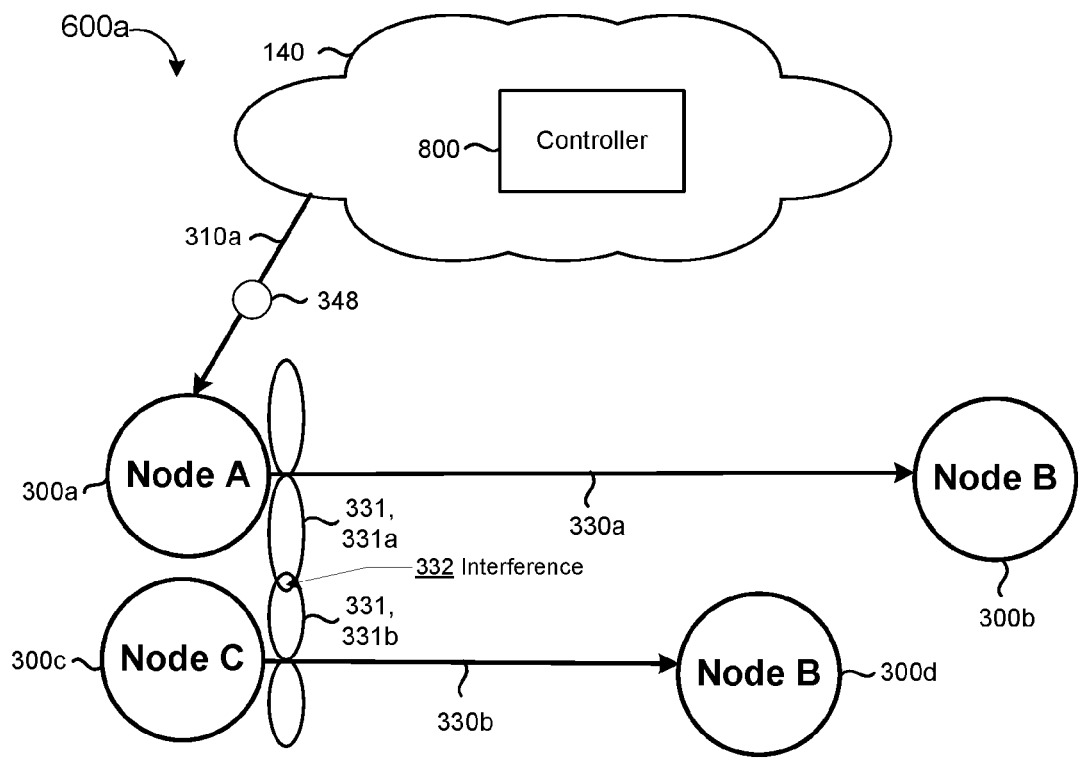
FIG. 6A is a schematic view of a controller transmitting beam tuning instructions to a first node to mitigate interference levels.
Figure 6B:
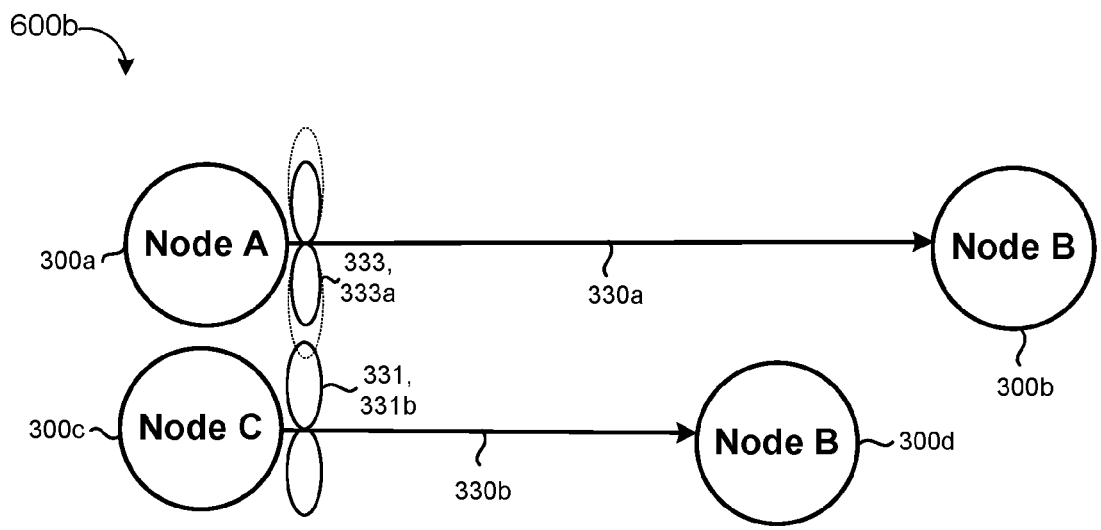
FIG. 6B is a schematic view of a first node emitting reduced side lobes to mitigate interference levels.

Referring to FIGS. 6A and 6B, in some implementations, the controller 800 identifies the first communication link 330a between the first node 300a and the second node 300b and a second communication link 330b between a third node 300c and a fourth node 300b. FIG. 6A shows side lobe levels 331, 331a emitting from a first directional beam transmission of the first node 300a when communicating with the second node 300b over the first communication link 330a, and side lobe levels 331, 331b emitting from a second directional beam transmission of the third node 300c when communicating with the fourth node 300d over the second communication link 330b. The controller 800 identifies interference 332 when the side lobe levels 331a of the first node 300a overlap with the side lobe levels 331b of the second node 300b. The controller 800 may identify the interference 332 based on the first node 300a and/or the third node 300c reporting the interference 332. In some examples, the controller 800 identifies the interference 332 based on BF histories 366 associated with the nodes 300a, 300c obtained from the memory hardware 144. In these examples, the BF histories 366 indicate beam vectors used by the first node 300a and third node 300c when communicating over their associated communication link 330a, 330b. Additionally or alternatively, the controller 800 may identify the interference 332 based on location information 362 associated with the nodes 300a, 300c obtained from the memory hardware 144 in combination with antenna phase weights 366 and/or antenna amplitude weights 368 specified by the beam forming configuration 370 stored on the nodes' memory hardware 304.

Upon identifying the interference 332 between the first node 300a and the third node 300c, the controller 800 obtains locations and beam histories of the first node 300a and the third node 300b from the memory hardware 144 and determines beam tuning instructions 348 for the first node 300a based on the first and third node locations and BF histories. FIG. 6A shows the controller 800 transmitting the beam tuning instructions 348 to the first node 300a via the first node connection 310a. FIG. 6B shows the beam tuning instructions 348 received by the first node 300a causing the first node 300a to emit reduced side lobe levels 333, 333a that no longer overlap or interfere with the side lobe levels 331b of the third node 300c. The beam tuning instructions 348 may cause the first node 300a to adjust antenna phase weights 376 and/or antenna amplitude weights 378 to emit the reduced side lobe levels 333a. Accordingly, the controller 800 uses the beam tuning instructions 348 to mitigate interference levels over one or more communication links 330a, 330b. The controller 800 may additionally or alternatively determine beam tuning instructions 348 for the third node 300c to mitigate the interference 332 by reducing the side lobe levels 331b associated with the third node 300c.

Figure 7:
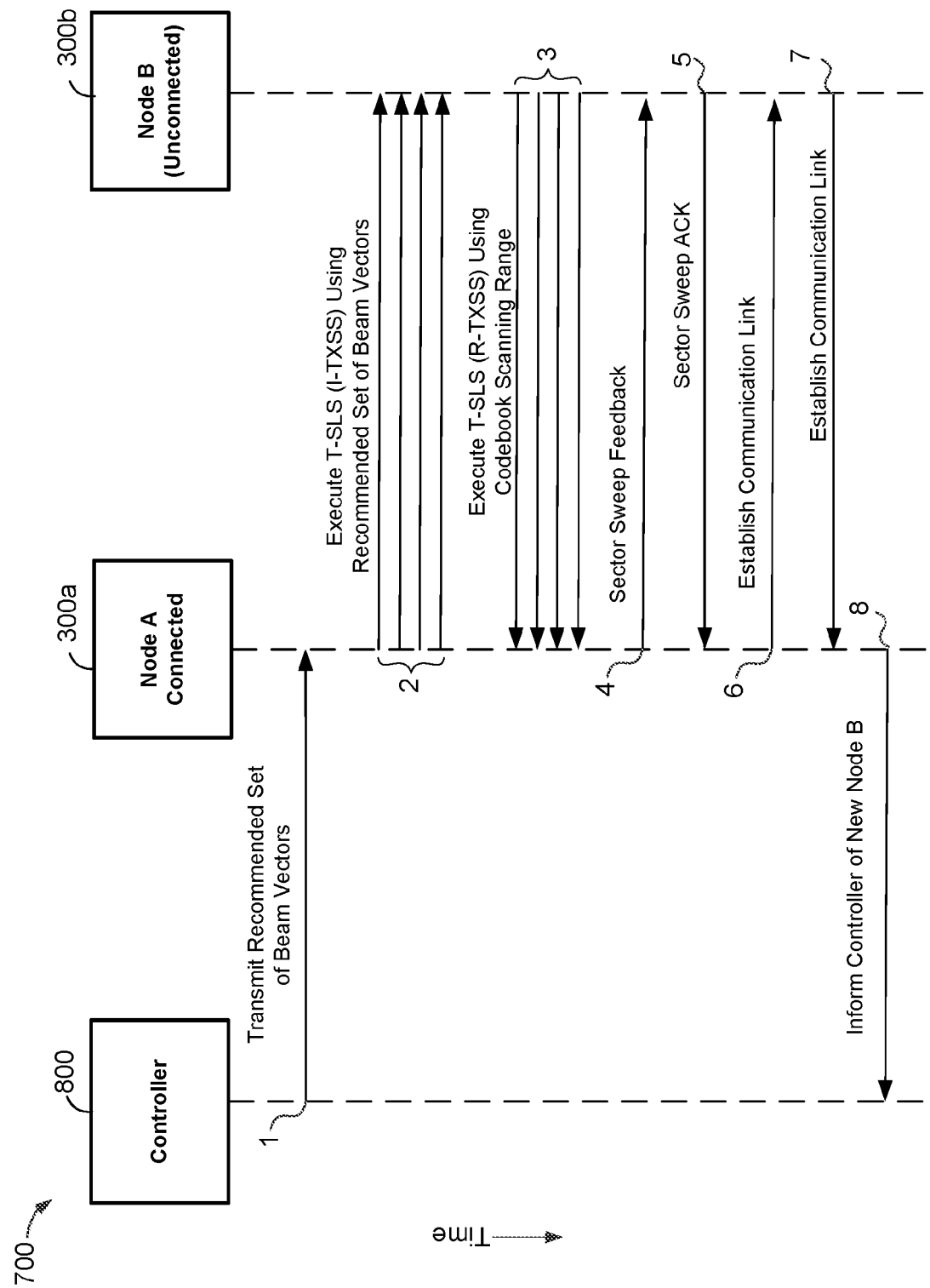
FIG. 7 is a schematic view of example operations performed by a controller when a new node is introduced to a mesh network.

FIG. 7 is a diagram 700 illustrating example operations performed by the controller 800 of the network system 10 when the second node 300b is a new node introduced to the network 200, but is disconnected from the network 200 and the controller 800. The diagram may be described with reference 4A-4D when the second node 300b is disconnected from the controller 800 (e.g., the second node connection 310b does not exist). The vertical y-axis indicates time increasing from the top to the bottom. The controller 800 instructs the first node 300a to initiate beam forming with the second node 300b to discover the second node 300b and establish/close the first communication link 330a. The controller 800 determines the first recommended set of beam vectors 342a to constrain the transmitting scanning range 372 (e.g., specified by the configuration 370) based on a relative location of the second node 300b if the location of the second node is known. At time 1, the controller 800 transmits the first recommended set of beam vectors 342a to the first node 300a, and at time 2, the first node 300a executes beam forming training with the second node 300b by executing the T-SLS (e.g., TXSS) using the first recommended set of beam vectors 342a. Accordingly, the T-SLS transmits transmitter directional beams 380 within the restricted transmitting scan range 373 (FIG. 4B). Time 2 corresponds to a time range while the T-SLS (e.g., TXSS) executes. In addition, node 300b during this time may execute a receiver sector sweep, sweeping through an RX codebook. At time 3, the second node 300b on discovering node 300a and attempting to be discovered by node 300a executes the responder T-SLS (e.g., TXSS) using a responder T-SLS scan range 374 specified by the configuration 370 associated with the second node 300b. The responder T-SLS scan range 374 may be adapted based on the optimal beam used during a R-SLS executed by the second node 300b to discover node 300a. Here, the first node 300a receives one or more responder directional beams 390 while the second node 300b executes the responder T-SLS (e.g., TXSS). Node 300a may indicate in its initiator T-SLS (e.g., TXSS) transmissions the period of time which it will be listening for any responder T-SLS (e.g., TXSS) transmissions from other nodes. The received responder directional beams 390 at node 300a during the responder T-SLS (e.g., TXSS) indicate the optimal initiator beam vector 382 received by the second node 300b during the initiator T-SLS (e.g., TXSS) at time 2. Time 3 corresponds to a time range while the responder T-SLS (e.g., TXSS) executes. At time 4, the first node 300a transmits sector sweep feedback to the second node 300b that indicates an optimal responder beam vector 392 received by the first node 300a during the responder T-SLS (e.g., TXSS) at time 3. At time 5, when the second node 300b receives the sector sweep feedback from the first node 300a, the second node 300b transmits a sector sweep acknowledgement (ACK) to the first node 300a. At time 6, the first node 300a establishes the first communication link 330a using the optimal initiator beam vector 382, and at time 7, the second node 300b establishes the first communication link 330a using the optimal responder beam vector 382. At time 8, the first node 300a reports the discovery of the second node 300b to the controller 800 and the BF history 346 associated with the now established first communication link 330a. The controller 800 may now provide BF information 34 to the first node 300a and/or the second node 300b for optimizing and maintaining the first communication link 330a.

Figure 8:
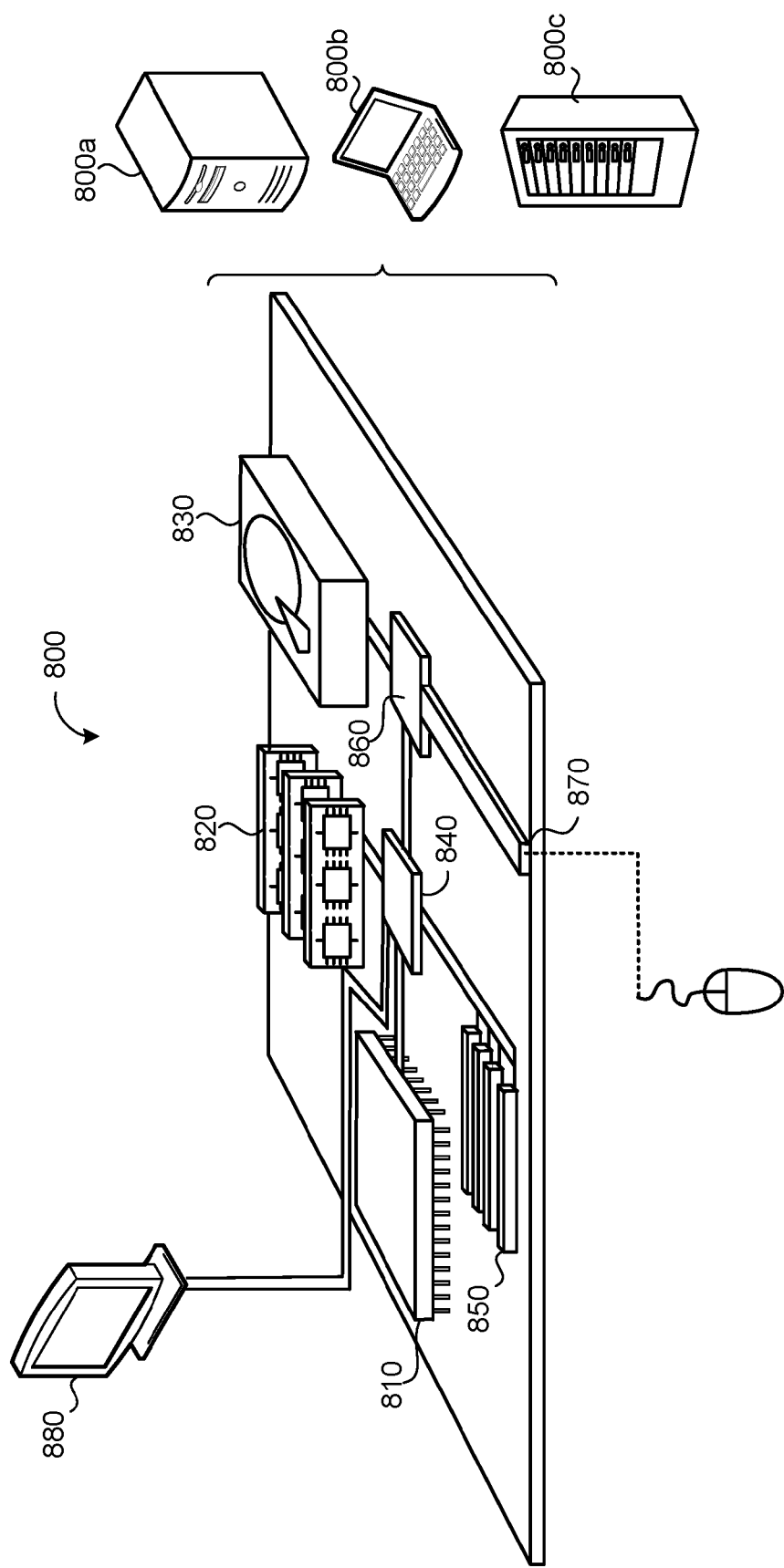
FIG. 8 is schematic view of an example computing device.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor (e.g., data processing hardware) 810, memory hardware 820, a storage device 830, a high-speed interface/controller 840 connecting to the memory hardware 820 and high-speed expansion ports 850, and a low speed interface/controller 860 connecting to low speed bus 870 and storage device 830. Each of the components 810, 820, 830, 840, 850, and 860, are interconnected using various busses, and may be mounted on a common motherboard or in other manners as appropriate. The data processing hardware 810 executes the and can process instructions for execution within the computing device 800, including instructions stored in the memory hardware 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory hardware 820 stores information non-transitorily within the computing device 800. The memory hardware 820 may be a computer-readable medium, a volatile memory unit(s), or non-volatile memory unit(s). The memory hardware 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory hardware 820, the storage device 830, or memory on the data processing hardware 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory hardware 820, the display 880 (e.g., through a graphics processor or accelerator), and to the high-speed expansion ports 850, which may accept various expansion cards (not shown). In some implementations, the low-speed controller 860 is coupled to the storage device 830 and low-speed expansion port 870. The low-speed expansion port 870, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be as the controller 800 executing on the remote system 140, as shown in FIGS. 1A-1B. For example, the controller 800 may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, at least a first node connection from a network external to the data processing hardware, the network including a network of nodes, each node configured to transmit and/or receive directional beams containing packets of data;
identifying, using the data processing hardware, an open first communication link between a first node and a second node of the network;
obtaining, at the data processing hardware, locations of the first node and the second node from memory hardware in communication with the data processing hardware;
determining, using the data processing hardware, a first recommended set of beam vectors to constrain a first scanning range of the first node when initiating beam forming with the second node based on the second node location relative to the first node location, the recommended first set of beam vectors constraining the first scanning range of the first node to expedite beam forming alignment with the second node; and
transmitting the first recommended set of beam vectors from the data processing hardware to the first node, the first recommended set of beam vectors causing the first node to execute beam forming training with the second node using the first recommended set of beam vectors to establish the first communication link with the second node.

2. The method of claim 1, further comprising:
obtaining, at the data processing hardware, antenna information associated with an antenna array of the first node from memory hardware in communication with the data processing hardware, the antenna information including at least one of a position of the antenna array, a geometry of the antenna array, an orientation of the antenna array, or an environment of the antenna array; and
determining the recommended first set of beam vectors based on the antenna information.

3. The method of claim 1, wherein each node of the network comprises:

a media access control layer configured to facilitate communication with one or more other nodes of the network; and
an application software layer in communication with the associated media access control layer and configured to facilitate communication with the data processing hardware.

4. A method comprising:
receiving, at data processing hardware, at least a first node connection from a network external to the data processing hardware, the network including a network of nodes, each node configured to transmit and/or receive directional beams containing packets of data;
identifying, using the data processing hardware, an open first communication link between a first node and a second node of the network;
obtaining, at the data processing hardware, a location of the first node and locations of a third node and a fourth node associated with a second communication link from memory hardware in communication with the data processing hardware;
determining, using the data processing hardware, a first recommended set of beam vectors to constrain a first scanning range of the first node when initiating beam forming with the second node based on the first node location relative to the third node location and/or the fourth node location, the recommended first set of beam vectors constraining the first scanning range of the first node to mitigate interference with the second communication link between the third node and the fourth node; and
transmitting the first recommended set of beam vectors from the data processing hardware to the first node, the first recommended set of beam vectors causing the first node to execute beam forming training with the second node using the first recommended set of beam vectors to establish the first communication link with the second node.

5. A method comprising:
receiving, at data processing hardware, at least a first node connection from a network external to the data processing hardware, the network including a network of nodes, each node configured to transmit and/or receive directional beams containing packets of data;
identifying, using the data processing hardware, an open first communication link between a first node and a second node of the network;
determining, using the data processing hardware, a first recommended set of beam vectors to constrain a first scanning range of the first node when initiating beam forming with the second node; and
transmitting the first recommended set of beam vectors from the data processing hardware to the first node, the first recommended set of beam vectors causing the first node to execute beam forming training with the second node using the first recommended set of beam vectors to establish the first communication link with the second node,
wherein the first node executes beam forming training with the second node by:
executing an initiator transmitter sector level sweep constrained by the first recommended set of beam vectors;
receiving one or more responder directional beams from the second node while the second node executes a responder transmitter sector level sweep, the received responder directional beams indicating an optimal initiator beam vector received by the second node during the initiator transmitter sector level sweep;

transmitting sector sweep feedback to the second node, the sector sweep feedback indicating an optimal responder beam vector received by the first node during the responder transmitter sector level sweep; and when a sector sweep acknowledgement is received from the second node, establishing the first communication link using the optimal initiator beam vector at the first node and the optimal responder beam vector at the second node.

6. The method of claim 5, wherein at least one of the first node or the second node execute a receiver sector level sweep to determine an optimal receiving beam vector while the other one of the first node or the second node executes the corresponding one of the initiator transmitter sector level sweep or the responder transmitter sector level sweep, the established first communication link based on the optimal receiving beam vector associated with at least one of the first node or the second node.

7. The method of claim 5, further comprising:
when the second node is connected to the network and the data processing hardware:
  obtaining, at the data processing hardware, a location of the first node from memory hardware in communication with the data processing hardware;
  determining, using the data processing hardware, a second recommended set of beam vectors based on the first node location to constrain a second scanning range of the second node when the first node initiates the beam forming with the second node; and
  transmitting the second recommended set of beam vectors from the data processing hardware to the second node, the second recommended set of beam vectors causing the second node to execute at least one of:
    the responder transmitter sector level sweep constrained by the second recommended set of beam vectors; or
    a receiver sector level sweep constrained by the second set of beam vectors while first node executes the initiator transmitter sector level sweep.

8. The method of claim 5, further comprising:
when the first communication link is established between the first node and the second node:
  receiving, at the data processing hardware, the optimal initiator beam vector and the optimal responder beam vector from at least one of the first node or the second node; and
  providing beam refinement protocol instructions to the first node and/or the second node based on the optimal initiator beam vector and the optimal responder beam vector, the beam refinement protocol instructions, when received by the first node and/or the second node, causing a beam refinement protocol procedure to execute between the first node and the second node to optimize the first communication link.

9. A method comprising:
receiving, at data processing hardware, at least a first node connection from a network external to the data processing hardware, the network including a network of nodes, each node configured to transmit and/or receive directional beams containing packets of data;

identifying, using the data processing hardware, an open first communication link between a first node and a second node of the network;

determining, using the data processing hardware, a first recommended set of beam vectors to constrain a first scanning range of the first node when initiating beam forming with the second node; and transmitting the first recommended set of beam vectors from the data processing hardware to the first node, the first recommended set of beam vectors causing the first node to execute beam forming training with the second node using the first recommended set of beam vectors to establish the first communication link with the second node, wherein the first node executes beam forming training with the second node by:
  when the second node comprises an undiscovered node:
    executing an initiator transmitter sector level sweep constrained by the first recommended set of beam vectors while the second node executes a receiver sector level sweep, the second node determining an optimal receiving beam vector associated with the receiver sector level sweep while the first node executes the initiator transmitter sector level sweep;
    receiving one or more responder directional beams from the second node while the second node executes a responder transmitter sector level sweep, the received responder directional beams constrained by a set of beam vectors using the optimal receiving beam vector and indicating an optimal initiator beam vector received by the second node during the initiator transmitter sector level sweep and the responder directional beams;
    establishing the first communication link with the second node when the first node captures one or more of the responder directional beams from the first node during the responder transmitter sector level sweep; and
    informing the data processing hardware that the first communication link is established between the first node and the second node.

10. A method comprising:
receiving, at data processing hardware, at least a first node connection from a network external to the data processing hardware, the network including a network of nodes, each node configured to transmit and/or receive directional beams containing packets of data;

identifying, using the data processing hardware, an open first communication link between a first node and a second node of the network;

determining, using the data processing hardware, a first recommended set of beam vectors to constrain a first scanning range of the first node when initiating beam forming with the second node;

transmitting the first recommended set of beam vectors from the data processing hardware to the first node, the first recommended set of beam vectors causing the first node to execute beam forming training with the second node using the first recommended set of beam vectors to establish the first communication link with the second node;

determining, using the data processing hardware, whether the first node is rediscovered after an intermittent disconnection from the network; and when the first node is rediscovered after an intermittent disconnection from the network:
  receiving, at the data processing hardware, a connection request from the first node requesting connection to the previously established first communication link with the second node;
  obtaining, at the data processing hardware, locations and beam histories of the first node and the second node from memory hardware in communication with the data processing hardware, the beam forming histories indicating optimal initiator transmit and receive beam vectors and optimal responder transmit and receive beam vectors associated with the previously established first communication link;
  determining, using the data processing hardware, bootstrap beam forming instructions based on the locations and beam forming histories of the first and the second node; and
  transmitting the bootstrap beam forming instructions to the first node and the second node, the bootstrap beam forming instructions, when received by the first node and the second node, causing first node and the second node to:
    re-establish the first communication link using the optimal initiator transmit and receive beam vectors and the optimal responder transmit and receive beam vectors specified by the beam forming histories without executing a sector level sweep procedure between the first node and the second node; and
    execute a beam refinement protocol procedure to optimize the re-established first communication link.

11. A method comprising:
receiving, at data processing hardware, at least a first node connection from a network external to the data processing hardware, the network including a network of nodes, each node configured to transmit and/or receive directional beams containing packets of data;
identifying, using the data processing hardware, an open first communication link between a first node and a second node of the network;
determining, using the data processing hardware, a first recommended set of beam vectors to constrain a first scanning range of the first node when initiating beam forming with the second node;
transmitting the first recommended set of beam vectors from the data processing hardware to the first node, the first recommended set of beam vectors causing the first node to execute beam forming training with the second node using the first recommended set of beam vectors to establish the first communication link with the second node;
determining, using the data processing hardware, whether the first communication link is associated with a secondary route not scheduled for data transfer; and
when the first communication link is associated with a secondary route not scheduled for data transfer, instructing, using the data processing hardware, the first node and the second node to periodically execute a beam tracking procedure to maintain the first communication link while not in use.

12. A method comprising:
receiving, at data processing hardware, at least a first node connection from a network external to the data processing hardware, the network including a network of nodes, each node configured to transmit and/or receive directional beams containing packets of data;
identifying, using the data processing hardware, an open first communication link between a first node and a second node of the network;
determining, using the data processing hardware, a first recommended set of beam vectors to constrain a first scanning range of the first node when initiating beam forming with the second node;
transmitting the first recommended set of beam vectors from the data processing hardware to the first node, the first recommended set of beam vectors causing the first node to execute beam forming training with the second node using the first recommended set of beam vectors to establish the first communication link with the second node;
identifying, using the data processing hardware, a second communication link between a third node and the second node of the network; and
when the first communication link and the second communication link are outside an interference threshold:
  determining, using the data processing hardware, the first communication link and the second communication link will not interfere with each other; and
  scheduling, using the data processing hardware, overlapping service periods using the same frequency channel over the first communication link and the second communication link without instructing any of the nodes associated with the first and second communication links to perform an interference assessment.

13. The method of claim 12, further comprising:
when the first communication link and the second communication link are within the interference threshold, determining, using the data processing hardware, a propensity for interference between the first communication link and the second communication link; and one of
  determining, using the data processing hardware, beam tuning instructions for at least one of the nodes of the first communication link or the second communication link that causes the at least one node to adjust side lobe levels to mitigate the propensity for interference;
  instructing, using the data processing hardware, at least one of the nodes to perform an interference assessment;
  restricting, using the data processing hardware, the scheduling of overlapping service periods over the first communication link and the second communication link; or
  changing, using the data processing hardware, the frequency channel over at least one of the first communication link or the second communication link.

14. A method comprising:
receiving, at data processing hardware, at least a first node connection from a network external to the data processing hardware, the network including a network of nodes, each node configured to transmit and/or receive directional beams containing packets of data;
identifying, using the data processing hardware, an open first communication link between a first node and a second node of the network;
determining, using the data processing hardware, a first recommended set of beam vectors to constrain a first scanning range of the first node when initiating beam forming with the second node;

transmitting the first recommended set of beam vectors from the data processing hardware to the first node, the first recommended set of beam vectors causing the first node to execute beam forming training with the second node using the first recommended set of beam vectors to establish the first communication link with the second node;

identifying, using the data processing hardware, a third node relative to the first node causing interference over the first communication link;

obtaining, at the data processing hardware, locations and beam histories of the first node and the third node from memory hardware in communication with the data processing hardware, the beam forming histories indicating beam vectors used by the first node and the third node;

determining, using the data processing hardware, beam tuning instructions for the first node based on the first and third node locations and beam forming histories; and transmitting the beam tuning instructions from the data processing hardware to the first node, the beam tuning instructions when received by the first node causing the first node to adjust side lobe levels to mitigate the interference over the first communication link or the second communication link.

15. A network system comprising:

data processing hardware external to a mesh network, the mesh network including a network of nodes each operative to transmit and/or receive directional beams containing packets of data;

memory hardware in communication with the data processing hardware, the memory hardware storing instructions that when executed by the data processing hardware cause the data processing hardware to perform operations comprising:

receiving at least a first node connection from a network external to the data processing hardware, the network including a network of nodes, each node configured to transmit and/or receive directional beams containing packets of data;

identifying an open first communication link between a first node and a second node of the network;

obtaining locations of the first node and the second node from memory hardware in communication with the data processing hardware;

determining a first recommended set of beam vectors to constrain a first scanning range of the first node when initiating beam forming with the second node based on the second node location relative to the first node location, the recommended first set of beam vectors constraining the first scanning range of the first node to expedite beam forming alignment with the second node; and transmitting the first recommended set of beam vectors from the data processing hardware to the first node, the first recommended set of beam vectors causing the first node to execute beam forming training with the second node using the first recommended set of beam vectors to establish the first communication link with the second node.

16. The system of claim 15, wherein the operations further comprise:

obtaining antenna information associated with an antenna array of the first node from memory hardware in communication with the data processing hardware, the antenna information including at least one of a position of the antenna array, a geometry of the antenna array, an orientation of the antenna array, or an environment of the antenna array; and determining the recommended first set of beam vectors based on the antenna information.

17. The system of claim 15, wherein each node of the network comprises:

a media access control layer configured to facilitate communication with one or more other nodes of the network; and an application software layer in communication with the associated media access control layer and configured to facilitate communication with the data processing hardware.

18. A network system comprising:

data processing hardware external to a mesh network, the mesh network including a network of nodes each operative to transmit and/or receive directional beams containing packets of data;

memory hardware in communication with the data processing hardware, the memory hardware storing instructions that when executed by the data processing hardware cause the data processing hardware to perform operations comprising:

receiving at least a first node connection from a network external to the data processing hardware, the network including a network of nodes, each node configured to transmit and/or receive directional beams containing packets of data;

identifying an open first communication link between a first node and a second node of the network;

obtaining a location of the first node and locations of a third node and a fourth node associated with a second communication link from memory hardware in communication with the data processing hardware;

determining a recommended first set of beam vectors to constrain a first scanning range of the first node when initiating beam forming with the second node based on the first node location relative to the third node location and/or the fourth node location, the recommended first set of beam vectors constraining the first scanning range of the first node to mitigate interference with the second communication link between the third node and the fourth node; and transmitting the first recommended set of beam vectors from the data processing hardware to the first node, the first recommended set of beam vectors causing the first node to execute beam forming training with the second node using the first recommended set of beam vectors to establish the first communication link with the second node.

19. A network system comprising:

data processing hardware external to a mesh network, the mesh network including a network of nodes each operative to transmit and/or receive directional beams containing packets of data;

memory hardware in communication with the data processing hardware, the memory hardware storing instructions that when executed by the data processing hardware cause the data processing hardware to perform operations comprising:

receiving at least a first node connection from a network external to the data processing hardware, the network including a network of nodes, each node configured to transmit and/or receive directional beams containing packets of data;

identifying an open first communication link between a first node and a second node of the network;

determining a first recommended set of beam vectors to constrain a first scanning range of the first node when initiating beam forming with the second node; and transmitting the first recommended set of beam vectors from the data processing hardware to the first node, the first recommended set of beam vectors causing the first node to execute beam forming training with the second node using the first recommended set of beam vectors to establish the first communication link with the second node, wherein the first node executes beam forming training with the second node by:
  executing an initiator transmitter sector level sweep constrained by the first recommended set of beam vectors;
  receiving one or more responder directional beams from the second node while the second node executes a responder transmitter sector level sweep, the received responder directional beams indicating an optimal initiator beam vector received by the second node during the initiator transmitter sector level sweep;
  transmitting sector sweep feedback to the second node, the sector sweep feedback indicating an optimal responder beam vector received by the first node during the responder transmitter sector level sweep; and
  when a sector sweep acknowledgement is received from the second node, establishing the first communication link using the optimal initiator beam vector at the first node and the optimal responder beam vector at the second node.

20. The system of claim 19, wherein at least one of the first node or the second node execute a receiver sector level sweep to determine an optimal receiving beam vector while the other one of the first node or the second node executes the corresponding one of the initiator transmitter sector level sweep or the responder transmitter sector level sweep, the established first communication link based on the optimal receiving beam vector associated with at least one of the first node or the second node.

21. The system of claim 19, wherein the operations further comprise:
when the second node is connected to the network and the data processing hardware:
  obtaining a location of the first node from memory hardware in communication with the data processing hardware;
  determining a second recommended set of beam vectors based on the first node location to constrain a second scanning range of the second node when the first node initiates the beam forming with the second node; and
  transmitting the second recommended set of beam vectors from the data processing hardware to the second node, the second recommended set of beam vectors causing the second node to execute at least one of:
    the responder transmitter sector level sweep constrained by the second recommended set of beam vectors; or
    a receiver sector level sweep constrained by the second set of beam vectors while first node executes the initiator transmitter sector level sweep.

22. The system of claim 19, wherein the operations further comprise:
when the first communication link is established between the first node and the second node;
  receiving the optimal initiator beam vector and the optimal responder beam vector from at least one of the first node or the second node; and
  providing beam refinement protocol instructions to the first node and/or the second node based on the optimal initiator beam vector and the optimal responder beam vector, the beam refinement protocol instructions, when received by the first node and/or the second node, causing a beam refinement protocol procedure to execute between the first node and the second node to optimize the first communication link.

23. A network system comprising:
data processing hardware external to a mesh network, the mesh network including a network of nodes each operative to transmit and/or receive directional beams containing packets of data;

memory hardware in communication with the data processing hardware, the memory hardware storing instructions that when executed by the data processing hardware cause the data processing hardware to perform operations comprising:
  receiving at least a first node connection from a network external to the data processing hardware, the network including a network of nodes, each node configured to transmit and/or receive directional beams containing packets of data;
  identifying an open first communication link between a first node and a second node of the network;
  determining a first recommended set of beam vectors to constrain a first scanning range of the first node when initiating beam forming with the second node; and
  transmitting the first recommended set of beam vectors from the data processing hardware to the first node, the first recommended set of beam vectors causing the first node to execute beam forming training with the second node using the first recommended set of beam vectors to establish the first communication link with the second node, wherein the first node executes beam forming training with the second node by:
  when the second node comprises an undiscovered node;
    executing an initiator transmitter sector level sweep constrained by the first recommended set of beam vectors while the second node executes a receiver sector level sweep, the second node determining an optimal receiving beam vector associated with the receiver sector level sweep while the first node executes the initiator transmitter sector level sweep;
    receiving one or more responder directional beams from the second node while the second node executes a responder transmitter sector level sweep, the received responder directional beams constrained by a set of beam vectors using the optimal receiving beam vector and indicating an optimal initiator beam vector received by the second node during the initiator transmitter sector level sweep and the responder directional beams;
established the first communication link with the second node when the first node captures one or more of the responder directional beams from the first node during the responder transmitter sector level sweep; and
informing the data processing hardware that the first communication link is established between the first node and the second node.

24. A network system comprising:
data processing hardware external to a mesh network, the mesh network including a network of nodes each operative to transmit and/or receive directional beams containing packets of data;
memory hardware in communication with the data processing hardware, the memory hardware storing instructions that when executed by the data processing hardware cause the data processing hardware to perform operations comprising:
receiving at least a first node connection from a network external to the data processing hardware, the network including a network of nodes, each node configured to transmit and/or receive directional beams containing packets of data;
identifying an open first communication link between a first node and a second node of the network;
determining a first recommended set of beam vectors to constrain a first scanning range of the first node when initiating beam forming with the second node;
transmitting the first recommended set of beam vectors from the data processing hardware to the first node, the first recommended set of beam vectors causing the first node to execute beam forming training with the second node using the first recommended set of beam vectors to establish the first communication link with the second node;
determining whether the first node is rediscovered after an intermittent disconnection from the network; and
when the first node is rediscovered after an intermittent disconnection from the network:
receiving a connection request from the first node requesting connection to the previously established first communication link with the second node;
obtaining locations and beam histories of the first node and the second node from memory hardware in communication with the data processing hardware, the beam forming histories indicating optimal initiator transmit and receive beam vectors and optimal responder transmit and receive beam vectors associated with the previously established first communication link;
determining bootstrap beam forming instructions based on the locations and beam forming histories of the first and the second node; and
transmitting the bootstrap beam forming instructions to the first node and the second node, the bootstrap beam forming instructions, when received by the first node and the second node, causing first node and the second node to:
re-establish the first communication link using the optimal initiator transmit and receive beam vectors and the optimal responder transmit and receive beam vectors specified by the beam forming histories without executing a sector level sweep procedure between the first node and the second node; and
execute a beam refinement protocol procedure to optimize the re-established first communication link.

25. A network system comprising:
data processing hardware external to a mesh network, the mesh network including a network of nodes each operative to transmit and/or receive directional beams containing packets of data;
memory hardware in communication with the data processing hardware, the memory hardware storing instructions that when executed by the data processing hardware cause the data processing hardware to perform operations comprising:
receiving at least a first node connection from a network external to the data processing hardware, the network including a network of nodes, each node configured to transmit and/or receive directional beams containing packets of data;
identifying an open first communication link between a first node and a second node of the network;
determining a first recommended set of beam vectors to constrain a first scanning range of the first node when initiating beam forming with the second node;
transmitting the first recommended set of beam vectors from the data processing hardware to the first node, the first recommended set of beam vectors causing the first node to execute beam forming training with the second node using the first recommended set of beam vectors to establish the first communication link with the second node;
determining whether the first communication link is associated with a secondary route not scheduled for data transfer; and
when the first communication link is associated with a secondary route not scheduled for data transfer, instructing the first node and the second node to periodically execute a beam tracking procedure to maintain the first communication link while not in use.

26. A network system comprising:
data processing hardware external to a mesh network, the mesh network including a network of nodes each operative to transmit and/or receive directional beams containing packets of data;
memory hardware in communication with the data processing hardware, the memory hardware storing instructions that when executed by the data processing hardware cause the data processing hardware to perform operations comprising:
receiving at least a first node connection from a network external to the data processing hardware, the network including a network of nodes, each node configured to transmit and/or receive directional beams containing packets of data;
identifying an open first communication link between a first node and a second node of the network;
determining a first recommended set of beam vectors to constrain a first scanning range of the first node when initiating beam forming with the second node;
transmitting the first recommended set of beam vectors from the data processing hardware to the first node, the first recommended set of beam vectors causing the first node to execute beam forming training with the second node using the first recommended set of beam vectors to establish the first communication link with the second node;

identifying a second communication link between a third node and a second node of the network; and when the first communication link and the second communication link are outside an interference threshold:

determining the first communication link and the second communication link will not interfere with each other; and scheduling overlapping service periods using the same frequency over the first communication link and the second communication link without instructing any of the nodes associated with the first and second communication links to perform an interference assessment.

27. The system of claim 26, wherein the operations further comprise:

when the first communication link and the second communication link are within the interference threshold, determining a propensity for interference between the first communication link and the second communication link; and one of determining beam tuning instructions for at least one of the nodes of the first communication link or the second communication link that causes the at least one node to adjust side lobe levels to mitigate the propensity for interference;

instructing at least one of the nodes to perform an interference assessment;

restricting the scheduling of overlapping service periods over the first communication link and the second communication link; or changing the frequency channel over at least one of the first communication link or the second communication link.

28. A network system comprising:

data processing hardware external to a mesh network, the mesh network including a network of nodes each operative to transmit and/or receive directional beams containing packets of data;

memory hardware in communication with the data processing hardware, the memory hardware storing instructions that when executed by the data processing hardware cause the data processing hardware to perform operations comprising:

receiving at least a first node connection from a network external to the data processing hardware, the network including a network of nodes, each node configured to transmit and/or receive directional beams containing packets of data;

identifying an open first communication link between a first node and a second node of the network;

determining a first recommended set of beam vectors to constrain a first scanning range of the first node when initiating beam forming with the second node;

transmitting the first recommended set of beam vectors from the data processing hardware to the first node, the first recommended set of beam vectors causing the first node to execute beam forming training with the second node using the first recommended set of beam vectors to establish the first communication link with the second node;

identifying a third node relative to the first node causing interference over the first communication link;

obtaining locations and beam histories of the first node and the third node from the memory hardware, the beam forming histories indicating beam vectors used by the first node and the third node:

determining beam tuning instructions for the first node based on the first and third node locations and beam forming histories; and transmitting the beam tuning instructions to the first node, the beam tuning instructions when received by the first node causing the first node to adjust side lobe levels to mitigate the interference over the first communication link or the second communication link.

* * * * *